US010805961B2

(12) United States Patent
Zhang et al.

(10) Patent No.: US 10,805,961 B2
(45) Date of Patent: Oct. 13, 2020

(54) METHODS AND APPARATUS TO SUPPORT ENHANCED RANDOM ACCESS PROCEDURE IN NR SYSTEM WITH BEAMFORMING

(71) Applicant: MEDIATEK SINGAPORE PTE. LTD., Singapore (SG)

(72) Inventors: Yuanyuan Zhang, Beijing (CN); Chia-Hao Yu, Hsinchu (TW); Chia-Chun Hsu, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 6 days.

(21) Appl. No.: 16/310,217

(22) PCT Filed: Nov. 3, 2017

(86) PCT No.: PCT/CN2017/109295
§ 371 (c)(1),
(2) Date: Dec. 14, 2018

(87) PCT Pub. No.: WO2018/082654
PCT Pub. Date: May 11, 2018

(65) Prior Publication Data
US 2019/0159264 A1 May 23, 2019

(51) Int. Cl.
*H04W 74/08* (2009.01)
*H04B 7/06* (2006.01)
(Continued)

(52) U.S. Cl.
CPC .......... *H04W 74/0833* (2013.01); *H04B 7/06* (2013.01); *H04B 7/0617* (2013.01);
(Continued)

(58) Field of Classification Search
CPC ... H04W 72/046; H04W 24/10; H04W 16/28; H04W 74/0833; H04B 7/06; H04B 7/0617
See application file for complete search history.

(56) References Cited

U.S. PATENT DOCUMENTS

2007/0293172 A1   12/2007  Shi et al.
2011/0285633 A1*  11/2011  Bathiche ............... G06F 3/0238
                                                              345/168
(Continued)

FOREIGN PATENT DOCUMENTS

CN    101473555 A    7/2009
CN    104285385 A    1/2015
(Continued)

OTHER PUBLICATIONS

International Search Report and Written Opinion dated Jan. 29, 2018 in PCT/CN2017/109295 filed Nov. 3, 2017.
(Continued)

*Primary Examiner* — Brian D Nguyen
(74) *Attorney, Agent, or Firm* — Oblon, McClelland, Maier & Neustadt, L.L.P.

(57) ABSTRACT

Aspects of the disclosure provide a method for determination of a transmission or reception beam format in a random access process. The method can include determining, at a local entity, the Tx beam format or the Rx beam format for communication between the local entity and a remote entity during the random access process between the local entity and the remote entity in a wireless communication system employing beamforming techniques according to historical operations and channel reciprocity availability. The method can further includes transmitting or receiving, at the local entity, a random access message exchanged between the
(Continued)

local entity and the remote entity according to the determined Tx beam format or Rx beam format, respectively.

16 Claims, 13 Drawing Sheets

(51) Int. Cl.
    *H04W 16/28*     (2009.01)
    *H04W 24/10*     (2009.01)
    *H04W 72/04*     (2009.01)
(52) U.S. Cl.
    CPC ........... *H04W 16/28* (2013.01); *H04W 24/10* (2013.01); *H04W 72/046* (2013.01)

(56) References Cited

U.S. PATENT DOCUMENTS

| | | |
|---|---|---|
| 2013/0301567 A1 | 11/2013 | Jeong et al. |
| 2014/0010178 A1 | 1/2014 | Yu et al. |
| 2014/0177561 A1* | 6/2014 | Yu .................... H04W 72/042 370/329 |
| 2014/0323144 A1* | 10/2014 | Kim .................... H04B 7/0617 455/452.1 |
| 2016/0099763 A1 | 4/2016 | Chen |
| 2017/0207843 A1* | 7/2017 | Jung .................... H04B 7/0408 |
| 2018/0159600 A1* | 6/2018 | Kim .................... H04B 7/0617 |
| 2018/0248601 A1* | 8/2018 | Kishiyama ........... H04W 16/28 |
| 2019/0052331 A1* | 2/2019 | Chang ................. H04B 7/0626 |
| 2020/0044721 A1* | 2/2020 | Choi ................... H04B 7/0695 |

FOREIGN PATENT DOCUMENTS

| | | |
|---|---|---|
| CN | 104412519 A | 3/2015 |
| WO | WO 2016/055003 A1 | 4/2016 |

OTHER PUBLICATIONS

Extended European Search Report dated Feb. 13, 2020 in Patent Application No. 17867236.6, citing document AX therein, 8 pages.
"Beamformed Random Access in NR" ZTE, 3GPP TSG RAN WG1 Meeting #86, R1-166419, XP051142387, Aug. 13, 2016, 8 pages.

* cited by examiner

METHODS AND APPARATUS TO SUPPORT ENHANCED RANDOM ACCESS PROCEDURE IN NR SYSTEM WITH BEAMFORMING

INCORPORATION BY REFERENCE

This present disclosure claims the benefit of International Application No. PCT/CN2016/104621, "Methods and Apparatus to Support Enhanced Random Access Procedure in NR System with Beamforming" filed on Nov. 4, 2016; the subject matter of which is incorporated herein by reference.

TECHNICAL FIELD

This present disclosure relates to beam management techniques in wireless communication systems capable of beamformed transmission/reception. Particularly, the present disclosure relates to multi-beam based random access procedures in 5G new radio (NR) system operating in high frequency band (e.g., above 6 GHz).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Beamforming schemes can be employed to focus transmitted and/or received signal in a desired direction to compensate for unfavorable path loss. Millimeter wave frequency bands facilitate usage of a large number of antenna elements in a compact form factor to synthesize highly directional beams.

SUMMARY

Aspects of the disclosure provide a method. The method can include determining, at a local entity, a transmission (Tx) beam format or a reception (Rx) beam format for communication between the local entity and a remote entity during a random access process between the local entity and the remote entity in a wireless communication system employing beamforming techniques according to historical operations and channel reciprocity availability that includes one or more of, Tx/Rx channel reciprocity availability of the local entity, Tx/Rx channel reciprocity availability of the remote entity, whether a Rx beam measurement process is performed at the local entity, whether a remote best Tx beam known from the Rx beam measurement process is reported to the remote entity, whether a Tx beam measurement process is performed at the local entity, and whether a local best Tx beam known from the Tx beam measurement is received from the remote entity.

The method can further includes transmitting or receiving, at the local entity, a random access message (RAM) exchanged between the local entity and the remote entity according to the determined Tx beam format or Rx beam format, respectively.

In one example, the Tx beam format is one of following Tx beam formats: one transmission of the RAM using the local best Tx beam, multiple transmissions of the RAM using the local best Tx beam, one round of Tx beam sweeping, and a full Tx/Rx beam sweeping for transmission of the RAM. In one example, the Rx beam format is one of following Rx beam formats: one reception of the RAM using the local best Rx beam, multiple receptions of the RAM using the local best Rx beam, one round of Rx beam sweeping, and a full Tx/Rx beam sweeping for reception of the RAM.

In an embodiment, determining the Tx beam format includes determining the local entity's knowledge of the local best Tx beam, determining the remote entity's knowledge of the remote best Rx beam, and determining the Tx beam format based on the local entity's knowledge of the local best Tx beam, and the remote entity's knowledge of the remote best Rx beam.

In one example, determining the local entity's knowledge of the local best Tx beam includes when the local best Tx beam is received from the remote entity, or when local Tx/Rx channel reciprocity is available and the Rx beam measurement process is performed, determining the local entity knows the local best Tx beam, and when the local best Tx beam is not received from the remote entity, and when local Tx/Rx channel reciprocity is unavailable or the Rx beam measurement process is not performed, determining the local best Tx beam is unknown to the local entity.

In one example, determining the remote entity's knowledge of the remote best Rx beam includes when the local Tx beam measurement process is performed, or when remote Tx/Rx channel reciprocity is available and the remote best Tx beam is reported to the remote entity, determining the remote entity knows the remote best Rx beam, and when the local Tx beam measurement process is not performed, and when remote Tx/Rx channel reciprocity is unavailable or the remote best Tx beam is not reported to the remote entity, determining the remote best Rx beam is unknown to the remote entity.

In an embodiment, determining the Rx beam format includes determining the local entity's knowledge of the local best Rx beam, determining the remote entity's knowledge of the remote best Tx beam, and determining the Rx beam format based on the local entity's knowledge of the local best Rx beam, and the remote entity's knowledge of the remote best Tx beam.

In one example, determining the local entity's knowledge of the local best Rx beam includes when the local Rx beam measurement process is performed, or when local Tx/Rx channel reciprocity is available and the local best Tx beam is received from the remote entity, determining that the local entity knows the local best Rx beam, and when the local Rx beam measurement process is not performed, and when local Tx/Rx channel reciprocity is unavailable or the local best Tx beam is not received from the remote entity, determining that the local best Rx beam is unknown to the local entity.

In one example, determining the remote entity's knowledge of the remote best Tx beam includes when the remote best Tx beam is reported to the remote entity, or remote Tx/Rx channel reciprocity is available and the local Tx beam measurement process is performed, determining the remote entity knows the remote best Tx beam, and when the remote best Tx beam is not reported to the remote entity, and remote Tx/Rx channel reciprocity is unavailable or the local Tx beam measurement process is not performed, determining the remote best Tx beam is unknown to the remote entity.

Aspects of the disclosure provide an apparatus that include circuitry configured to determine a transmission (Tx) beam format or a reception (Rx) beam format for communication between the apparatus and a remote entity during a random access process between the apparatus and the remote entity in a wireless communication system employing beamforming techniques according to historical operations and channel reciprocity availability, and transmit or receive a random access message (RAM) exchanged between the apparatus and the remote entity according to the determined Tx beam format or Rx beam format, respectively.

Aspects of the disclosure provide a non-transitory computer-readable medium storing computer instructions that, when executed by a processor, cause the processor to perform the method for determination of a transmission or reception beam format in a random access process.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
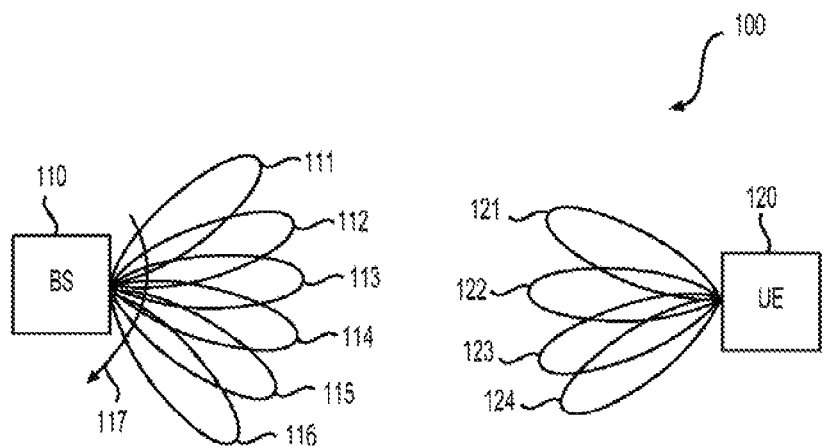
FIG. 1 shows a beam-based wireless communication system according to an embodiment of the disclosure.

FIG. 1 shows a beam-based wireless communication system 100 according to an embodiment of the disclosure. The system 100 can include a base station (BS) 110 and user equipment (UE) 120. The system 100 can employ the 5th generation (5G) technologies developed by the 3rd Generation Partnership Project (3GPP). For example, millimeter Wave (mm-Wave) frequency bands and beamforming technologies can be employed in the system 100. Accordingly, the BS 110 and the UE 120 can perform beamformed transmission or reception. In beamformed transmission, wireless signal energy can be focused on a specific direction to cover a target serving region. As a result, an increased antenna transmission (Tx) gain can be achieved in contrast to omnidirectional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate path loss or penetration loss in mm-Wave signal transmission.

The BS 110 can be a base station implementing a gNB node as specified in new radio (NR) air interface standards being developed by 3GPP. The BS 110 can be configured to control one or more antenna arrays, referred to as transmission reception points (TRPs), to form directional Tx or Rx beams for transmitting or receiving wireless signals. In FIG. 1 example, the BS 110 can use one or more TRPs to form Tx or Rx beams 111-116 to cover a cell. Each of the beams 111-116 can be generated towards different direction simultaneously or in different time intervals. In one example, the BS 110 is configured to perform a beam sweeping 117 to transmit control channel and/or data channel signals. During the beam sweeping 117, Tx beams 111-116 towards different directions can be successively formed in a time division multiplex (TDM) manner to cover the cell. During each time interval for transmission of one of the Tx beams 111-116, a set of control channel data and/or data channel data can be transmitted. The beam sweeping 117 can be performed repeatedly with a certain periodicity.

The UE 120 can be a mobile phone, a laptop computer, a vehicle carried mobile communication device, and the like. Similarly, the UE 120 can employ one or more antenna arrays to generate directional Tx or Rx beams for transmitting or receiving wireless signals. In FIG. 1 example, four Tx or Rx beams 121-124 can be successively generated to cover a target area.

In one example, the BS 110 and the UE 120 can perform a downlink beam measurement process in order to select a BS Tx beam and a UE Rx beam for downlink transmission. For example, multiple beam pairs exist between the BS 110 and the UE 120. Each beam pair can include one of the BS Tx beams 111-116 and one of the UE Rx beams 121-124. However, for a certain environment of the BS and the UE, different beam pairs may have different qualities. Based on the beam measurement process, for example, a beam pair with a highest quality can be selected, or a beam pair with a quality above a threshold can be selected with considerations of other factors.

Specifically, during the beam measurement process, the BS 110 can repeat beam sweepings for a number of times equal to a number of UE Rx beams. During each beam sweeping, the BS Tx beams 111-116 can be successively transmitted to cover the cell. For each of the beam sweepings of the BS 110, the UE 120 can use one of the four Rx beams 121-124 to receive multiple transmissions corresponding to each BS Tx beams 111-116. Each of the BS Tx beams 111-116, when transmitted, can carry a measurement reference signal (MRS), e.g. synchronization signal block (SSB) or channel state information RS (CSI-RS). From the local entity, each reference signal transmitted by the remote entity is considered as a Tx beam. In this way, all combinations of beam pairs between the Tx beams 111-116 and Rx beams 121-124 can be established and investigated. For example, for each beam pair, the UE 120 can employ the MRS to compute one or more quality measurements, such as a signal-to-noise ratio (SNR) related metric, SINR related metric, reference signal received power (RSRP), or a reference signal received guality (RSRQ) for the respective beam pair. Based on the quality measurements, a best beam pair (or a preferred beam pair having a quality above a threshold) for downlink communication between the BS 110 and the UE 120 can be determined. Accordingly, a best BS Tx beam and a best UE Rx beam can accordingly be determined and known to the UE 120. The best BS Tx beam or the best UE Rx beam can correspond to the best beam pair with a highest quality, or the preferred beam pair with a quality above a threshold.

After the best BS Tx beam and UE Rx beam are determined at the UE 120, the UE 120 can report the measurement results to the BS 110. For example, the UE 120 can inform the BS 110 of the determined best BS Tx beam. For example, the MRSs can be associated with a BS Tx beam index. Thus, the UE 120 can identify each BS Tx beam accordingly. In another example, the UE 120 can identify each BS Tx beam based on transmission timings of each BS Tx beam 111-116. In some examples, a measurement report including the computed quality measurements can be provided to the BS 110 from the UE 120. In another example, each BS Tx beam is associated to one or one set of PRACH resource, which is informed to the UE through the system information. The BS derives the best BS Tx beam information according to the received PRACH. The BS 110 subsequently makes a decision to select a best BS Tx beam and later informs the UE 120 of the selection.

For uplink transmission, a similar beam measurement process and reporting process can be performed to determine a best UE Tx beam and a best BS Rx beam. For example, the UE 120 can perform beam sweepings with UE Tx beams for a number of times equal to a number of the BS Rx beams. During each beam sweeping of the UE 120, the BS 110 can use one of the BS Rx beams to receive uplink transmissions. Reference signals e.g. SRS or PRACH carried in each UE Tx beams can be employed to calculate beam pair quality measurements. Based on the quality measurements, a best UE Tx beam and a best BS Rx beam can be selected at the BS 110. The best UE Tx beam and the best BS Rx beam can correspond to an uplink beam pair with a highest quality or with a quality above a threshold. The BS 110 can then report the best UE Tx beam to the UE 120. By successively performing the above downlink and uplink beam measurement and report processes, the best UE Tx/Rx beams and the best BS Tx/Rx beams can be known at both the BS 110 and UE 120.

In some examples, Tx and Rx channel reciprocity (Tx/Rx reciprocity) can be available at the BS 110 and/or the UE 120, and the above downlink and uplink beam measurement processes can be accordingly simplified. When Tx and Rx channel reciprocity is available at the BS 110, a best BS Tx (or Rx) beam can be determined if a best BS Rx (or Tx) beam has been known to the BS 110. For example, a same set of beamforming weights for generating the best BS Rx beam can be used to generate the best BS Tx beam. Similarly, when Tx and Rx channel reciprocity is available at the UE 120, a best UE Tx (or Rx) beam can be determined if a best UE Rx (or Tx) beam has been known to the UE 120.

As an example, assuming the Tx/Rx reciprocity holds at the BS 110, the above successively performed downlink and uplink beam measurement processes can be simplified and performed in the following way. After the best BS Tx beam is reported from the UE 120 to the BS 110, the best BS Rx beam can be known to the BS 110 due to the Tx/Rx reciprocity at the UE BS 110. In addition, the UE 120 can have knowledge that Tx/Rx reciprocity is available at the BS 110, and accordingly assume the BS 110 has knowledge of the best BS Rx beam after reporting the best BS Tx beam to the BS 110. Accordingly, during the uplink beam measurement process, the UE 120 can perform a beam sweeping for one round instead of six rounds. During the one-round beam sweeping, the BS 110 can receive transmissions corresponding to the UE Tx beam 121-124 with the best BS Rx beam. Subsequently, quality measurements can be calculated for each UE Tx beams 121-124. In this way, uplink beam measurement process can be simplified. Similarly, downlink beam measurement process can also be simplified.

Figure 2:
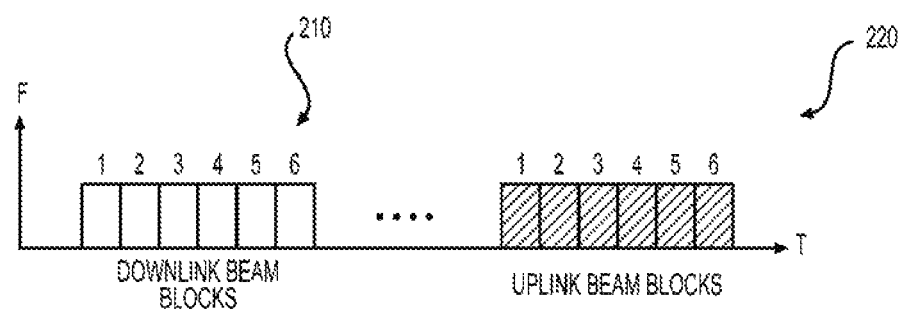
FIG. 2 shows an example of a base station (BS) transmission (Tx) and reception (Rx) beam resource configuration according to an embodiment of the disclosure.

FIG. 2 shows an example of a BS Tx and Rx beam resource configuration according to an embodiment of the disclosure. As shown, in the example configuration, a set of downlink beam blocks (DLBBs) 210 can be assigned and associated with a set of BS Tx beams, such as the BS Tx beams 111-116 in FIG. 1 example. The DLBBs contains the DL reference signal e.g. PSS/SSS/DM-RS or CSI-RS. If DLBBs contains PSS/SSS/DM-RS, the DLBBs are considered as SSBs. The set of DLBBs 210 can include six physical time-frequency resource blocks DLBB 1-DLBB 6 each corresponding to one of the BS Tx beams 111-116. The BS 110 can be configured to periodically perform beam sweepings with the BS Tx beams 111-116 to cover the cell. Accordingly, each of the DLBBs 210 can be transmitted by a respective BS Tx beam during each beam sweeping. Similarly, a set of uplink beam blocks (ULBBs) 220 can be assigned and associated with a set of BS Rx beams, such as the BS Rx beams 111-116 in FIG. 1 example. In each ULBB, PRACH, SRS, PUCCH or PUSCH can be transmitted by the UE. The BS 110 can be configured to periodically perform beam sweepings with the BS Rx beams 111-116 to cover the cell. Each of the ULBBs 220 can be received with a respective BS Rx beam during each beam sweeping.

In alternative examples, the BS Tx or Rx beam resource configuration can be different. For example, the DLBBs 1-6 (or ULBBs 1-6) may be unconnected with each other in the time domain Or, members of the DLBBs 210 and members of ULBBs 220 can be interleaved with each other. U. S. Patent Pub. No. 2016/0087704 provides additional examples and descriptions of BS Tx and Rx beam resource configurations, which is incorporated herein by reference in its entirety.

Figure 3:
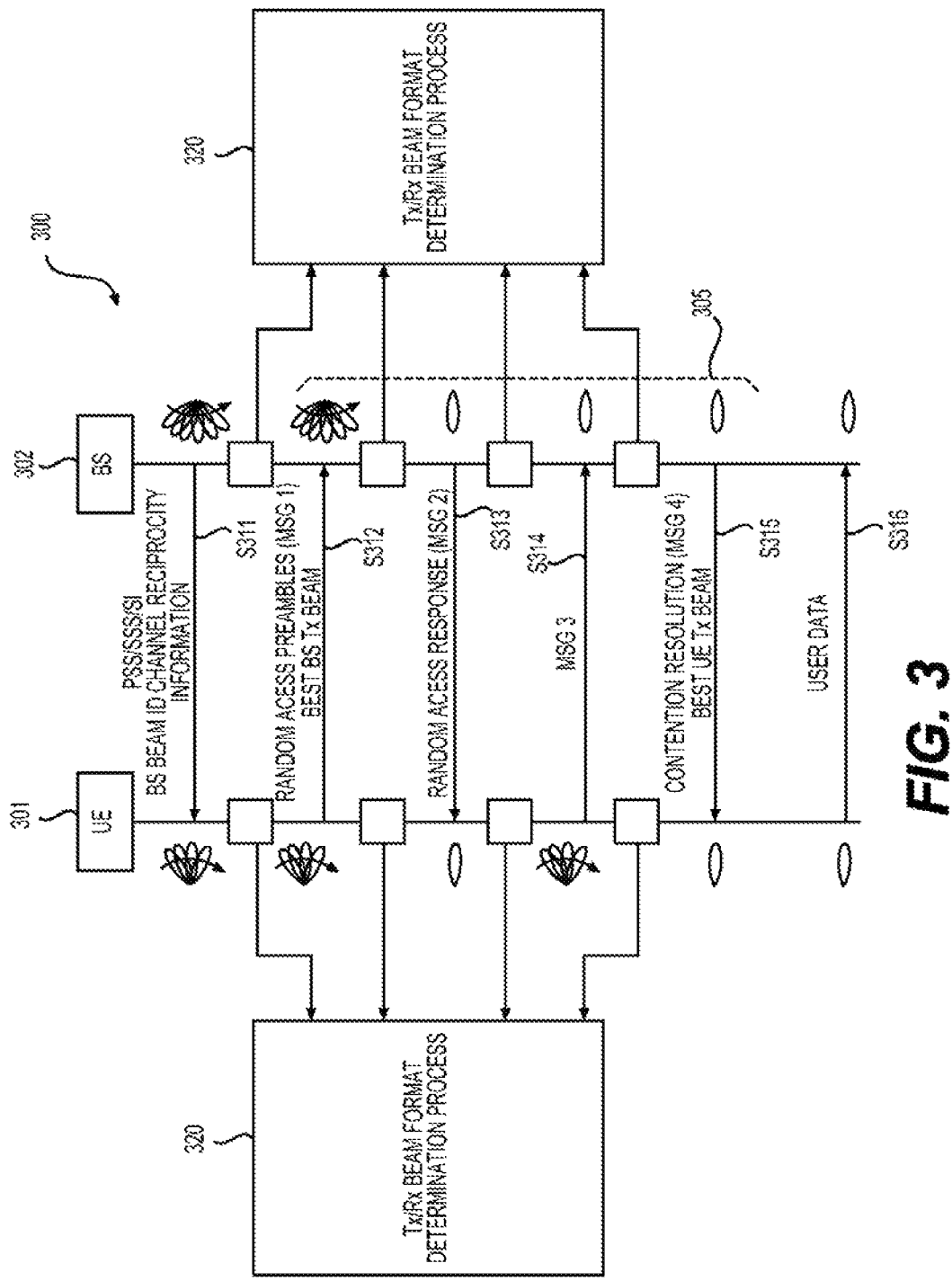
FIG. 3 shows an initial access process according to an embodiment of the disclosure.

FIG. 3 shows a random access process 300 according to an embodiment of the disclosure. The random access process 300 can be performed between a UE 301 and a BS 302 in a beam-based wireless communication system. The random access process 300 can include steps S311-S316. Among those steps, the steps S312-S315 form a random access process 305. Particularly, before each step of the random access process 305, a Tx or Rx beam format determination process 320 can be performed by the UE 301 or the BS 302 to determine how beam-formed transmission or reception is to be performed.

The UE 301 and the BS 302 are capable of beamforming and beamformed transmission or reception. For example, the BS 302 can periodically perform beam sweepings with a set of Tx or Rx beams to cover a cell in a way similar to BS 110. Each Tx or Rx beam can be associated with a BS DLBB or BS ULBB, respectively, as described in FIG. 2 example. With respect to the UE 301, when a best BS Tx beam is known to the BS 302, the BS 302 can use this best BS Tx beam to transmit data to the UE 301, while when a best BS Rx is known, the BS 302 can use this best Rx beam to receive signals from the UE 301.

The UE 301 can use a best UE Tx beam to transmit one or more UE ULBBs when the best UE Tx beam is already known, and use a best UE Rx beam to receive one or more BS DLBBs when the best UE Rx beam is already known. When the best UE Tx beam is unknown to the UE 301, the UE 301 may have to perform at least one round Tx beam sweeping to transmit ULBBs in multiple directions expecting the BS 302 can receive an ULBB with a best beamforming gain among the multiple transmissions. Similarly, when the best UE Rx beam is unknown, the UE 301 may have to perform at least one round Rx beam sweeping to receive DLBBs in multiple directions.

At S311, the UE 301 receives synchronization signals, such as primary and secondary synchronization signals (PSSs and SSSs), and system information (SI) broadcasted from the BS 302. For example, the UE 301 is powered on and starts the initial access process 300 to establish a connection with the BS 302. For example, a synchronization signal block (SSB) can include a PSS and/or an SSS and physical broadcast channel (PBCH) symbols. A set of SSBs can be transmitted during a BS Tx beam sweeping with each BS Tx beam carrying one SSB. This beam-swept SSB transmission can be repeated according to a preconfigured periodicity. The UE 301 does not know its best Rx beam at this moment, thus perform one or more rounds of Rx beam sweepings to listen to BS DLBBs to capture transmissions of SSBs.

Subsequently, the UE 301 can acquire the system information including MIB (master Information) or RMSI (remaining system information) that may include BS Tx and Rx beam configurations indicating identities (IDs) and/or timings of the Tx or Rx beams. Based on that information, in one example, the UE 301 can perform a Tx beam measurement process. As a result, a best downlink beam pair including a best BS Tx beam (with a beam ID) and a best UE Rx beam can be determined. In addition, the system information may include random access configurations useful for the successive random access process 305, e.g. the PRACH resource configuration associated to each BS Tx beam e.g. SSBs. The system information may optionally include channel reciprocity information indicating BS Tx/Rx channel reciprocity is available at the BS 302.

After S311, the UE 301 can start to perform the random access process 305 that includes S312-S315. At S312, a set of random access preambles, referred to as a first random access message (MSG 1), can be transmitted from the UE 301 to the BS 302. As a best uplink beam pair including a best UE Tx beam and a best BS Rx beam is unknown at current stage, a full Tx/Rx beam sweeping can be performed. A full Tx/Rx beam sweeping can refer to a process in which data transmissions are performed on each combination of a Tx beam and a Rx beam between two entities (a UE and a BS). During the full Tx/Rx beam sweeping at S312, each beam pair can be used once for transmitting a random access preamble. In one example, preamble sequences are configured to be BS Tx beam-specific. Accordingly, the UE 301 can select preamble sequences corresponding to the best BS Tx beam determined during the beam measurement process at S311 for the preamble transmissions. In this way, information of the best BS Tx beam can be conveyed to the BS 302.

In addition, a best uplink beam pair including a best UE Tx beam and a BS Rx beam can be determined at S312. For example, the preamble sequences can also be configured to be UE Tx beam-specific. Thus, based on a detected preamble sequence with a highest receiving power or a receiving power above a threshold at the BS 302 among detected preamble sequences, the best UE Tx beam can be identified. As the same time, based on an ULBB carrying the detected preamble sequence with a highest receiving power or a receiving power above a threshold, a best BS Rx beam corresponding to the respective ULBB can be determined.

At S313, a random access response (RAR), referred to as a second random access message (MSG 2), can be transmitted from the BS 302 to the UE 301. The MSG2 can indicate a time advance for the UE 301 to synchronize with an uplink timing of the BS 302. In addition, the MSG 2 can include an uplink resource grant for later message transmission at S314. When a best BS Rx beam is known to the BS 302, the uplink resource grant can be within an ULBB corresponding to the best Rx beam. Further, as the BS 302 knows the best BS Tx beam according to S312, and the UE 301 knows the best UE Rx beam according to S311, the transmission of MSG2 is performed once, for example, on a DLBB corresponding to the best Tx beam.

At S314, the UE 301 can adjust the uplink timing and becomes synchronized with the BS 302. A third random access message (MSG 3) can be transmitted from the UE 301 to the BS 302. The MSG 3 can carry an identity of the UE 301. The UE 301 does not know the best UE Tx beam (although the best UE Tx beam is known to the BS 302 at S312), and the BS 302 knows the best BS Rx beam according to S312. Accordingly, the UE 301 can perform a beam sweeping to transmit MSG 3. Particularly, as the BS 302 knows the best BS Rx beam at S312, the BS 302 can configure the uplink resource grant for transmitting the MSG3 in a way that granted resources are included in ULBBs corresponding to the best UE Rx beam. Accordingly, when transmitting with each UE Tx beam, MSG 3 can be transmitted on an ULBB corresponding to the best BS Rx beam.

At S315, a contention resolution message, referred to as a fourth random access message (MSG 4), can be transmitted in downlink direction. The MSG 4 can carry the identity of the UE 301 indicating the UE 301 has succeeded in the initial access process 300. Similar to S312, the transmission of MSG 4 can be performed once. In addition, the BS 302 may convey information of the best UE Tx beam to the UE 301.

At S316, after the successful random access process 305, user data can be transmitted from the UE 301 to the BS 302. Particularly, the best UE Tx and Rx beams and the best BS Tx and Rx beams are all known to the UE 301 and the BS 302, respectively. Later communications can be conducted through the best uplink or downlink beam pairs.

In alternative examples, configurations, transceiver circuit characteristics, or other factors, of the UE 301 and the BS 302 can vary, and respective initial access processes or random access processes can be performed in different way. For example, Tx/Rx channel reciprocity may hold at the UE 301 or the BS 302. When the Tx/Rx channel reciprocity is available at the UE 301, for example, the UE 301 can know the best UE Tx beam after the beam measurement process performed at S311. Thus, at S312, the full Tx/Rx beam sweeping can be avoided, and the UE 301 performing multiple transmissions on multiple ULBBs corresponding to different BS Rx beams with the best UE Tx beam can suffice.

For another example, the BS 302 knows the best UE Tx beam at S312 in FIG. 3 example, and reports the best UE Tx beam at S315. However, due to different configurations, in one example, the BS 302 can report the best UE Tx beam at S313, which is earlier than S315. Accordingly, at S314, the UE 301 can perform one transmission with the best UE Tx beam instead of a Tx beam sweeping. In addition, the random access process 305 in FIG. 3 example is a contention-based process. In other examples, the random access process 305 can be a contention free process, and the steps 314 and 315 for exchanging MSG 3 and MSG 4 can be omitted from the random access process 305.

The Tx/Rx beam format determination process 320 can be performed to determine a Tx or Rx beam format for exchanging the random access messages (RAMs) during each step of the random access 305. For example, by performing the Tx/Rx beam format determination process 320, a Tx beam format can be determined at the UE 301 for message transmissions at S312 or S314, while a Rx beam format can be determined at the UE 301 for message receptions at S313 or S315. Similarly, by performing the Tx/Rx beam format determination process 320, a Rx beam format can be determined at the BS 302 for message receptions at S312 and S314, while a Tx beam format can be determined at the BS 302 for message transmissions at S313 and S315.

Figure 4A:
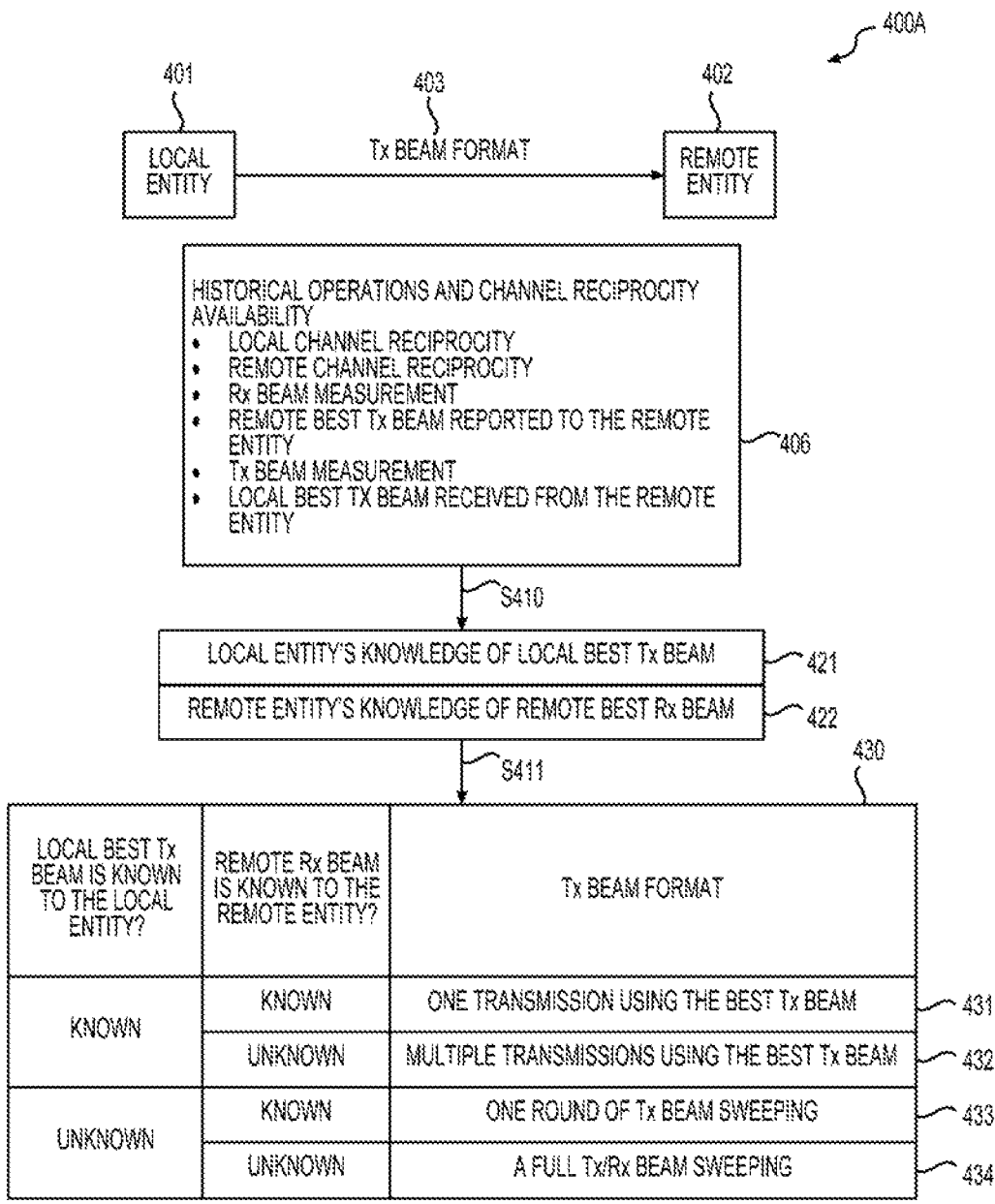
FIGS. 4A-4B show examples of a Tx beam format determination process, and a Rx beam format determination process, respectively, according to embodiments of the disclosure.
Figure 4B:
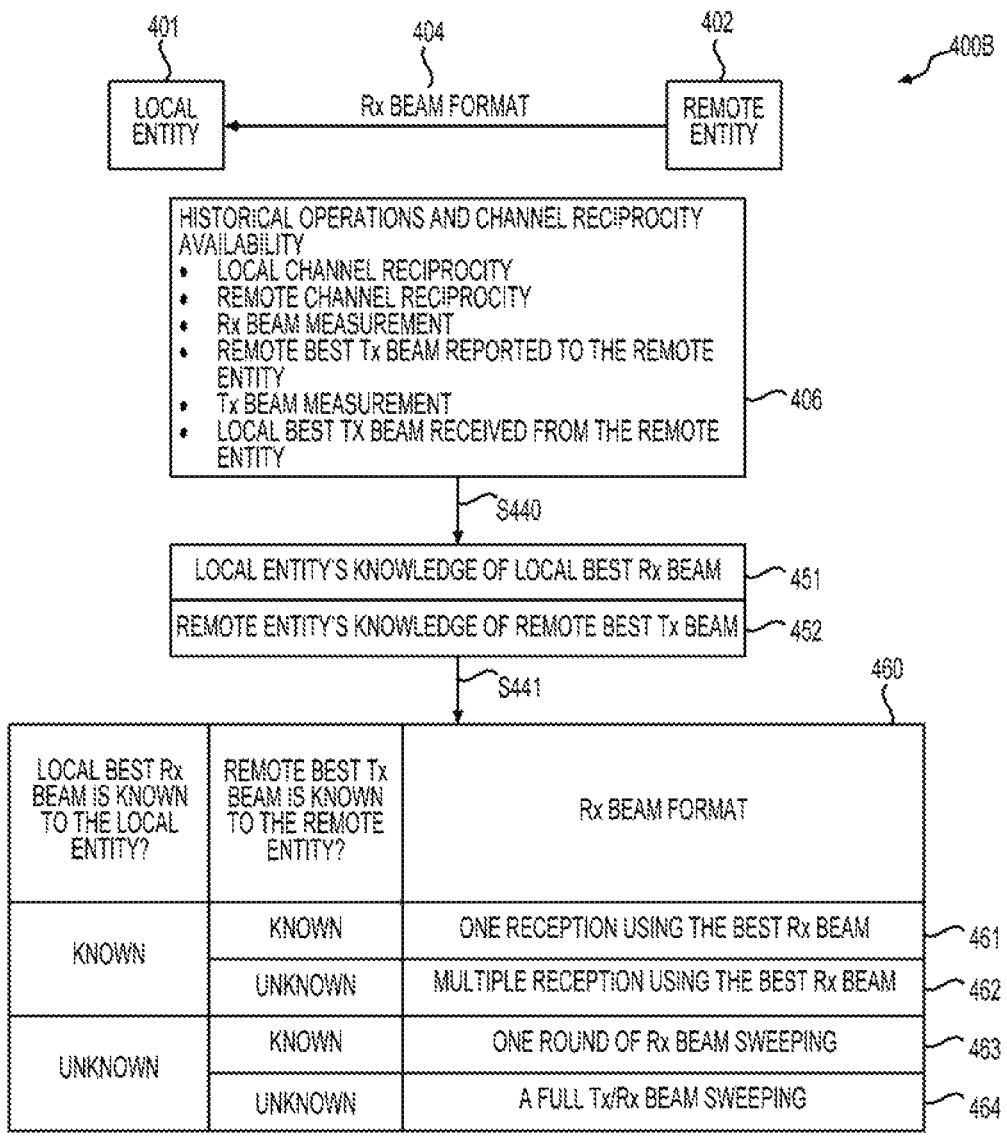

FIG. 4A and FIG. 4B show examples of a Tx beam format determination process 400A, and a Rx beam format determination process 400B, respectively, according to embodiments of the disclosure. As the same beam format determination process 400A or 400B can be performed at either the UE 301 or the BS 302, a local entity 401 and a remote entity 402 are used to represent the UE 301 or the BS 302 in FIGS. 4A-4B in order to simplify descriptions of the processes 400A and 400B. The local entity 401 or the remote entity 402 can refer to the UE 301 or the BS 302 depending on roles played by the UE 301 and the BS 302 during one exchange of a RAM.

In FIG. 4A, the Tx beam format determination process 400A can be performed to determine a Tx beam format 403 for the local entity 401 to transmit a RAM to the remote entity 402. As shown, the process 400A can include two steps S410 and S411.

At S410, local entity's knowledge of a local best Tx beam 421 can be determined, and remote entity's knowledge of a remote best Rx beam 422 can also be determined. The determination at S410 can be based on local historical operations, and local and remote Tx/Rx channel reciprocity availability 406. Specifically, the historical operations and channel reciprocity availability 406 can include at least one of:

local Tx/Rx channel reciprocity availability at the local entity, remote Tx/Rx channel reciprocity availability at the remote entity, a local Rx beam measurement process is performed or not, a remote best Tx beam known from the Rx beam measurement process is reported to the remote entity 402 or not, a local Tx beam measurement process is performed or not, and a local best Tx beam known from the Tx beam measurement process is received from the remote entity 402 or not.

The local Rx beam measurement process can refer to a downlink beam measurement process when the UE 301 is the local entity 401 and the BS 302 is the remote entity 402, while the local Rx beam measurement process can refer to an uplink beam measurement process when the BS 302 is the local entity 401 and the UE 301 is the remote entity 402. Similarly, the local Tx beam measurement process can refer to an uplink beam measurement process when the UE 301 is the local entity 401 and the BS 302 is the remote entity 402, while the local Tx beam measurement process can refer to a downlink beam measurement process when the BS 302 is the local entity 401 and the UE 301 is the remote entity 402.

At S411, based on the local entity 401's knowledge of the local best Tx beam 421 and the remote entity's knowledge of the remote best Rx beam 422, the Tx beam format 403 can be determined which can be one of four Tx beam formats 431-434 shown in table 430. Specifically, as shown in the table 430, corresponding to different combinations of whether a local best Tx beam is known to the local entity 401 and whether a remote best Rx beam is known to the remote entity 402, one of the four Tx beam formats can be selected.

For example, when the local best Tx beam is known to the local entity 401, the local entity 401 can use the local best Tx beam to transmit one or more RAMs. When the remote best Rx beam is known to the remote entity 402, the local entity 401 can assume the remote entity 402 will use the remote best Rx beam to receive the respective RAMs. Accordingly, the local entity 401 can select the Tx beam format 431 which indicates the local entity 401 can perform one transmission of a RAM using the local best Tx beam. In contrast, when the remote best Rx beam is unknown to the remote entity 402, the local entity 401 can assume the remote entity 402 will perform a beam sweeping and use each available Rx beam to perform a reception of the RAMs transmitted from the local entity 401. Accordingly, the local entity 401 can select the Tx beam format 432 which indicates the local entity 401 can perform multiple transmissions of a RAM using the best local Tx beam. The number of the multiple transmissions can equal to a number of remote Rx beams of the remote entity 402.

When the local best Tx beam is unknown to the local entity 401, the local entity 401 can perform one or more rounds of Tx beam sweepings to transmit a RAM multiple times with each of available local Tx beams. When the remote best Rx beam is known to the remote entity 402, the local entity 401 can assume the remote entity 402 will use the remote best Rx beam to receive the respective RAMs. Accordingly, the local entity 401 can select the Tx beam format 433 which indicates the local entity 401 can perform one round of Tx beam sweeping with each Tx beam transmitting a RAM once. In contrast, when the remote best Rx beam is unknown to the remote entity 402, the local entity 401 can assume the remote entity 402 will perform one or more beam sweepings and use each available Rx beam to perform at least one reception of the RAMs transmitted from the local entity 401. Accordingly, the local entity 401 can select the Tx beam format 434 which indicates the local entity 401 can perform a full Tx/Rx beam sweeping to transmit the RAMs.

The full Tx/Rx beam sweeping 434 can take one of two possible forms depending on beam configurations of the local and remote entities. In a first form, the local entity 401 can perform one round of beam sweeping, but perform multiple transmissions of a RAM with each local Tx beam. Accordingly, the remote entity 402 can perform multiple rounds of Rx beam sweepings and each Rx beam sweeping corresponds to the multiple transmissions with one local Tx beam. Take the beam configurations in FIG. 2 as an example, when the UE 120 plays the role of the local entity 401, and the BS 110 plays the role of the remote entity 402. The first form of full Tx/Rx beam sweeping can be performed as a beam operation indicated by the Tx beam format 434.

In a second form of the full Tx/Rx beam sweeping 434, the local entity 401 can perform multiple rounds of local Tx beam sweepings, and one transmission of a RAM is performed with each available Tx beam during each round of beam sweeping. Accordingly, the remote entity 402 can perform one round of Rx beam sweeping and each Rx beam occasion corresponds to one round of local Tx beam sweeping. In FIG. 2 example, when the BS 110 plays the role of the local entity 401, and the UE 120 plays the role of the remote entity 402. The second form of full Tx; Rx beam sweeping can be performed as a beam operation indicated by the Tx beam format 434.

In FIG. 4B, the Rx beam format determination process 400B can be performed to determine a Rx beam format 404 for the local entity 401 to receive a RAM from the remote entity 402. As shown, the process 400B can include two steps S440 and S441.

At S440, local entity's knowledge of a local best Rx beam 451 can be determined, and remote entity's knowledge of a remote best Tx beam 452 can also be determined. The determination at S440 can be based on the same set of local historical operations, and local and remote Tx/Rx channel reciprocity availability 406.

At S441, based on the local entity 401's knowledge of the local best Rx beam 451 and the remote entity's knowledge of the remote best Tx beam 452, the Rx beam format 404 can be determined which can be one of four Rx beam formats 461-464 shown in table 460. Specifically, as shown in the table 460, corresponding to different combinations of whether a local best Rx beam is known to the local entity 401 and whether a remote best Tx beam is known to the remote entity 402, one of the four Rx beam formats 461-464 can be selected.

For example, when the local best Rx beam is known to the local entity 401, the local entity 401 can use the local best Rx beam to receive one or more RAMs. When the remote best Tx beam is known to the remote entity 402, the local entity 401 can assume the remote entity 402 will use the remote best Tx beam to transmit the respective RAMs. Accordingly, the local entity 401 can select the Rx beam format 461 which indicates the local entity 401 can perform one reception of a RAM using the local best Rx beam. In contrast, when the remote best Tx beam is unknown to the remote entity 402, the local entity 401 can assume the remote entity 402 will perform a Tx beam sweeping and use each available Tx beam to perform a transmission of the RAM to the local entity 401. Accordingly, the local entity 401 can select the Rx beam format 462 which indicates the local entity 401 can perform multiple receptions using the best local Rx beam. The number of the multiple receptions can equal to a number of remote Tx beams of the remote entity 402.

When the local best Rx beam is unknown to the local entity 401, the local entity 401 can perform one or more Rx beam sweepings to receive a RAM multiple times with each of available local Rx beams. When the remote best Tx beam is known to the remote entity 402, the local entity 401 can assume the remote entity 402 will use the remote best Tx beam to transmit the respective RAMs. Accordingly, the local entity 401 can select the Rx beam format 463 which indicates the local entity 401 can perform one round of Rx beam sweeping with each Rx beam receiving once. In contrast, when the remote best Tx beam is unknown to the remote entity 402, the local entity 401 can assume the remote entity 402 will perform one or more Tx beam sweepings and use each available Tx beam to perform at least one transmission of the RAMs to the local entity 401. Accordingly, the local entity 401 can select the Rx beam format 464 which indicates the local entity 401 can perform a full Tx/Rx beam sweeping to receive the RAMs.

Similarly, the full Tx/Rx beam sweeping 464 can take one of two possible forms depending beam configurations of the local and remote entities. In a first form for reception, the local entity 401 can perform one round of Rx beam sweep-ing, but perform multiple receptions with each local Rx beam. Accordingly, the remote entity 402 can perform multiple rounds of Tx beam sweepings and each Tx beam sweeping corresponds to the multiple transmissions with one local Rx beam. Take the beam configurations in FIG. 2 as an example, when the UE 120 plays the role of the local entity 401, and the BS 110 plays the role of the remote entity 402. The first form of full Tx/Rx beam sweeping can be performed as a beam operation indicated by the Rx beam format 464.

In a second form of the full Tx/Rx beam sweeping 464 for reception, the local entity 401 can perform multiple rounds of local Rx beam sweepings, and one reception is performed with each available Rx beam during each round of Rx beam sweeping. Accordingly, the remote entity 402 can perform one round of Tx beam sweeping and each Tx beam occasion corresponds to one round of local Rx beam sweeping. In FIG. 2 example, when the BS 110 plays the role of the local entity 401, and the UE 120 plays the role of the remote entity 402. The second form of full Tx/Rx beam sweeping can be performed as a beam operation indicated by the Rx beam format 464.

Figure 5A:
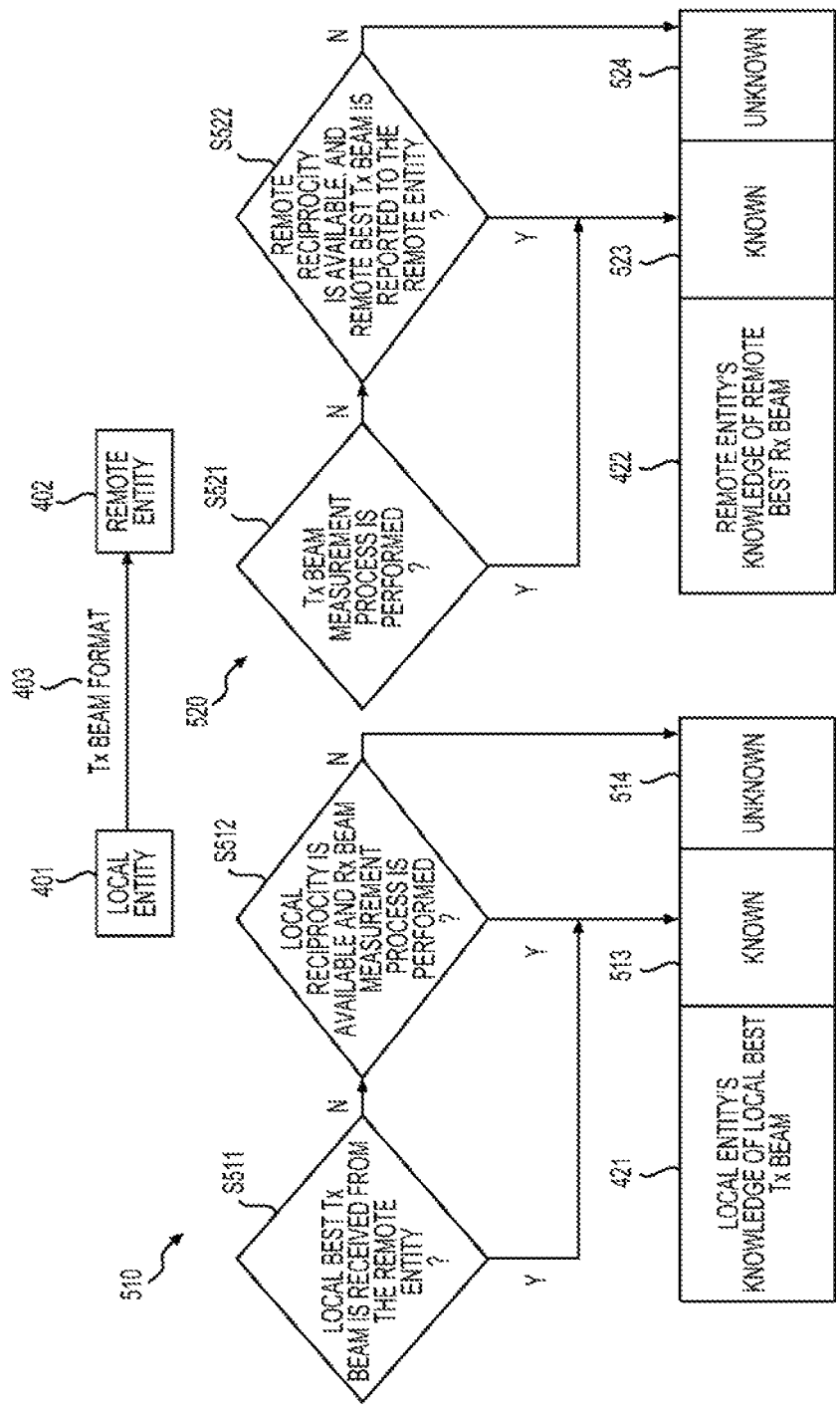
FIG. 5A shows a first process for determination of a local entity's knowledge of a local best Tx beam and a second process for determination of a remote entity's knowledge of a remote Rx beam according to embodiments of the disclosure.

In FIG. 4A, in order to determine the Tx beam format 403, the local entity 401's knowledge of the local best Tx beam 421 and the remote entity 402's knowledge of the remote best Rx beam 422 need to be determined. To this purpose, FIG. 5A shows a first process 510 for determination of the local entity 401's knowledge of the local best Tx beam 421 and a second process 520 for determination of the remote entity 402's knowledge of the remote best Rx beam 422 according to embodiments of the disclosure.

The process 510 can include two steps S511 and S512. At S511, according to historical operations, the local entity 401 can determine whether the local best Tx beam is received from the remote entity or not. When the local best Tx beam has been received from the remote entity 402, such as at S312 where the best BS Tx beam is received at the BS 302, the local entity 401 can determine the local entity 401 knows the local best Tx beam (block 513). Otherwise, the process 510 proceeds to S512.

At S512, the local entity 401 can determine whether local Tx/Rx channel reciprocity is available and a Rx beam measurement process has been performed. If the Rx beam measurement process has been processed, the local entity 401 can determine that the local best Rx beam has been determined based on the Rx beam measurement process. If the local Tx/Rx channel reciprocity holds, beamforming weights for generating the local best Rx beam can be used to generate the local best Tx beam. Accordingly, the local entity 401 can determine the local entity 401 knows the local best Tx beam (block 513). Otherwise, the local entity 401 can determine that the local best Tx beam is unknown (block 514).

The process 520 can include two steps S521 and S522. At S521, the local entity 401 can determine whether a Tx beam measurement process has been performed or not according to historical operations. If the Tx beam measurement process has been performed before, the local entity 401 can assume the remote entity 402 can know the best remote Rx beam 523 based on the Tx beam measurement process (block 523). Otherwise, the process 520 proceeds to S522.

At S522, the local entity 401 can determine whether Tx/Rx channel reciprocity holds at the remote entity 402. For example, the local entity 401 can have received information indicating the Tx/Rx channel reciprocity is available at the remote entity 402. If the local entity 401 does not receive any information about the Tx/Rx channel reciprocity availability at the remote entity 402, the local entity 401 can assume the Tx/Rx channel reciprocity is not available at the remote entity 402. In addition, the local entity 401 can determine whether the remote best Tx beam has been reported to the remote entity 402 based on historical operations. If the remote best Tx beam has been reported and the remote Tx/Rx channel reciprocity holds, the local entity 401 can determine the remote entity 402 knows the remote best Rx beam (block 523). Otherwise, the local entity 401 can determine the remote entity 402 does not know the remote best Rx beam (block 524).

Figure 5B:
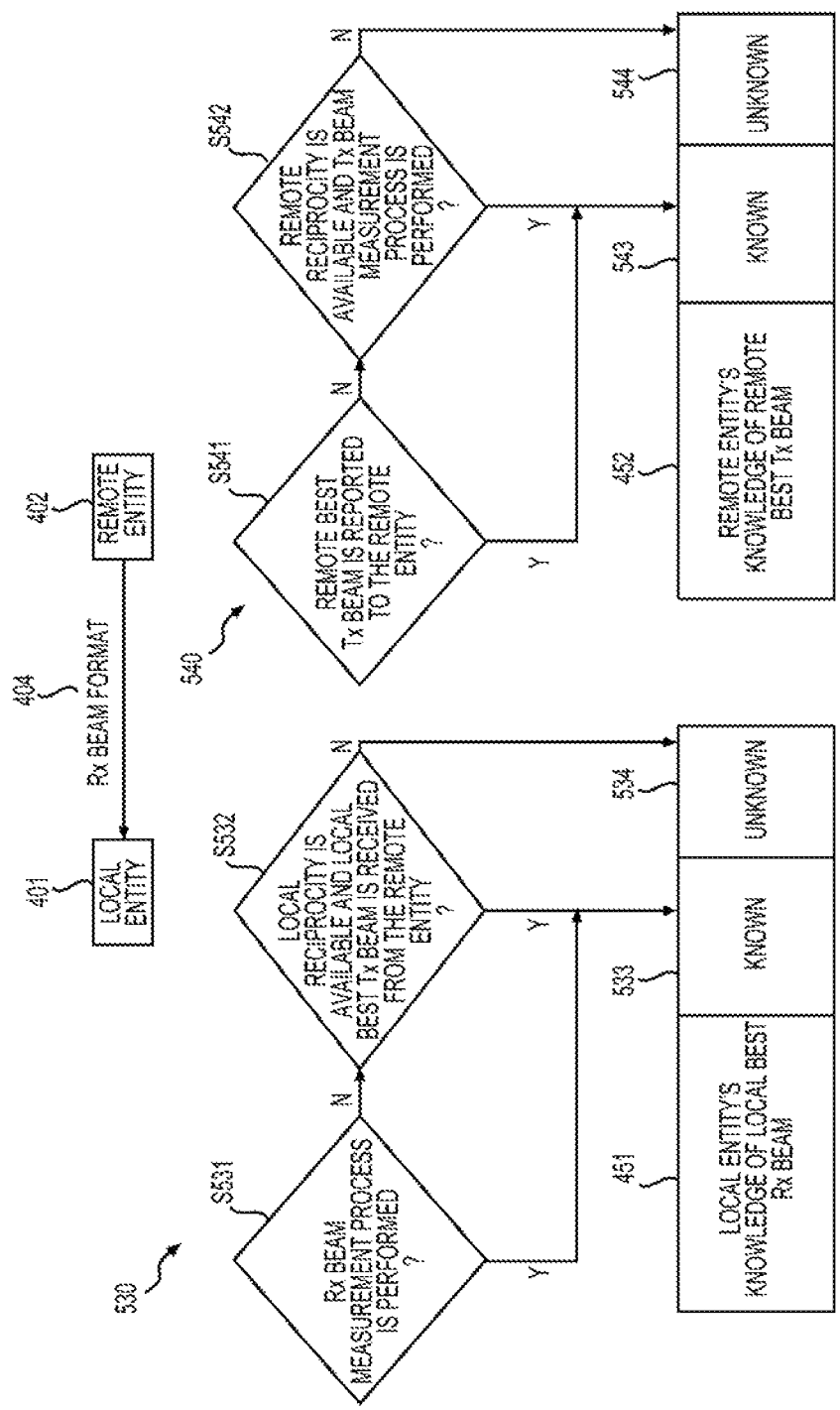
FIG. 5B shows a first process for determination of a local entity's knowledge of a local best Rx beam and a second process for determination of a remote entity's knowledge of a remote Tx beam according to embodiments of the disclosure.

In FIG. 4B, in order to determine the Rx beam format 404, the local entity 401's knowledge of the local best Rx beam 451 and the remote entity 402's knowledge of the remote Tx beam 452 need to be determined. To this purpose, FIG. 5B shows a first process 530 for determination of the local entity 401's knowledge of the local best Rx beam 451 and a second process 540 for determination of the remote entity 402's knowledge of the remote Tx beam 452 according to embodiments of the disclosure.

The process 530 can include two steps S531 and S532. At S531, according to historical operations, the local entity 401 can determine whether a Rx beam measurement process has been performed before. If the Rx beam measurement process has been performed, the local entity 401 can determine the local best Rx beam is known 533 based on the Rx beam measurement process (block 533). Otherwise, the process 530 can proceeds to S532.

At S532, the local entity 401 can determine whether local Tx/Rx channel reciprocity is available or not. If the local Tx/Rx channel reciprocity is available, the local entity 401 can further determine whether the local best Tx beam is received from the remote entity 402. If the local best Tx beam is received, the beamforming weights of the local best Tx beam can be used to generate the local best Rx beam. Accordingly, the local entity 401 can determine the local best Rx beam is known (block 533). Otherwise, the local entity 401 can determine the local best Rx beam is unknown (block 534).

The process 540 can include two steps 541 and 542. At S541, the local entity 401 can determine whether the remote best Tx beam is reported to the remote entity 402. If so, the local entity 401 can determine the remote best Tx beam is known to the remote entity 402 (block 543). Otherwise, the process 540 can proceed to S542.

At S542, the local entity 401 can first determine if remote Tx/Rx channel reciprocity holds at the remote entity 402. If so, the local entity 401 can further determine if a local Tx beam measurement process has been performed. If the Tx beam measurement process has been performed, the remote best Rx beam can be known at the remote entity 402. Accordingly, the local entity 401 can assume the remote entity 402 knows the remote best Tx beam because of the remote channel reciprocity (block 543). Otherwise, the local entity 401 can determine that the remote best Tx beam is unknown to the remote entity 402 (block 544).

Figure 6:
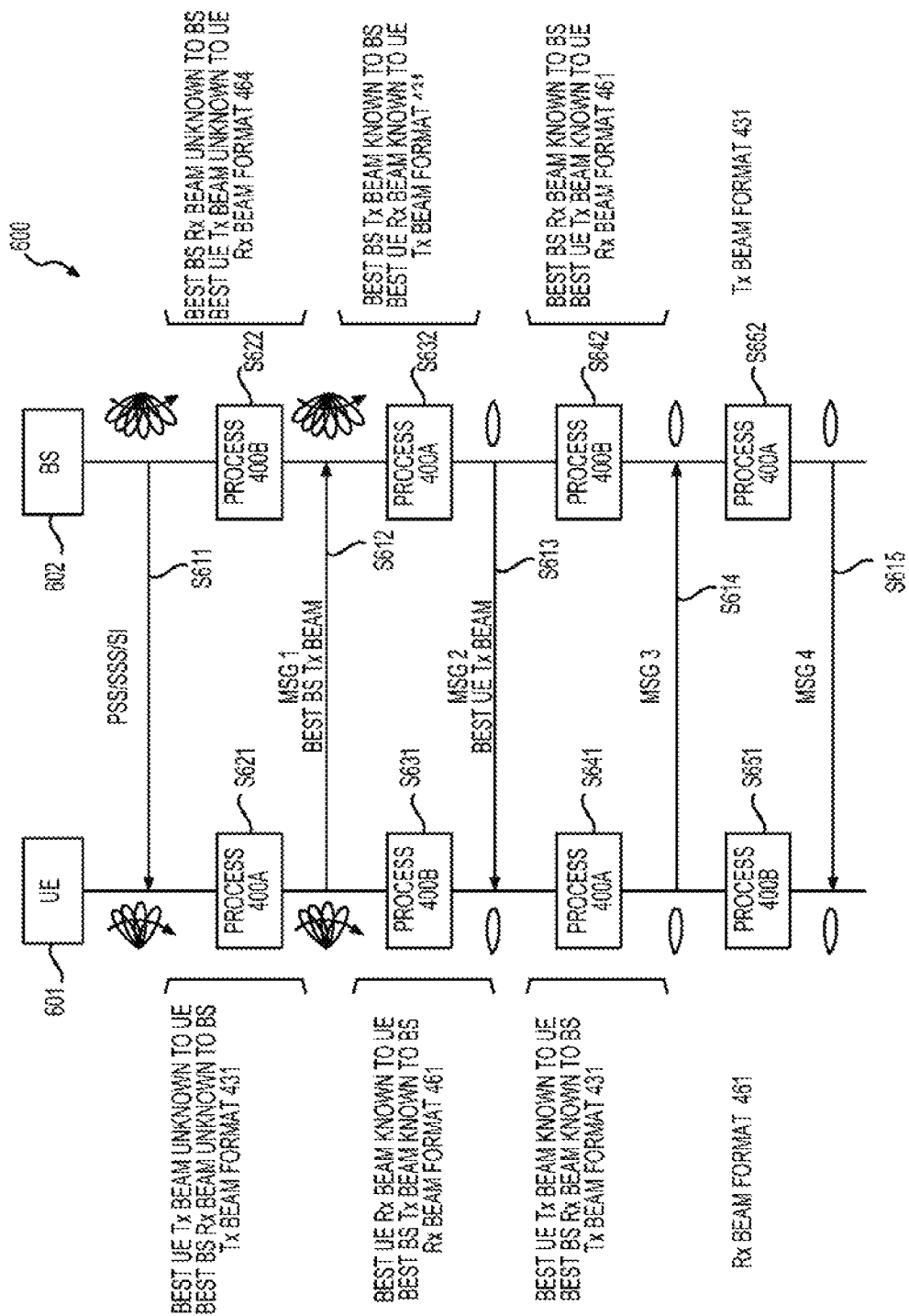
FIG. 6 shows an example random access process according to an embodiment of the disclosure.

FIG. 6 shows an example random access process 600 according to an embodiment of the disclosure. The process 600 can include steps S611-S615 performed by a UE 601 and a BS 602. The process 600 can include a random access process that includes steps S612-S615. Particularly, the Tx or Rx beam format determination process 400A or 400B can be performed (at steps of S621-S622, S631-S632, S641-S642, and S651-S652) before each step S612-S615 at the UE 601 or the BS 602 to determine a Tx or Rx beam format for exchanging RAMs MSG 1-MSG 4.

At S611, the BS 602 can periodically perform beam sweepings to transmit synchronization signals (PSS and SSS) and system information (SI) towards different directions to cover a cell of the BS 602. The UE 601 does not know a best UE Rx beam at this moment, and can perform a Rx beam sweeping to capture the PSS/SSS/SI signals. In addition, the UE 601 can perform a beam measurement process, for example, by using a MRS carried in each BS Tx beam carrying the PSS/SSS/SI. As a result, the best UE Rx beam and a best BS Tx beam can be determined.

At S621, the UE 601 can perform the process 400A to determine a Tx beam format for transmission of MSG 1. For example, based on historical operations, the UE 601 can determine that a best UE Tx beam is unknown, and a best BS Rx beam is unknown to the BS 602. Accordingly, the UE 601 can determine the Tx beam format 434 for transmission of MSG 1. In addition, the UE 601 can determine to convey the best BS Tx beam to the BS 602. For example, preamble sequences in MSG 1 can be BS Tx beam specific. Based on the preamble sequences, the BS 602 can determine the best BS Tx beam.

At S622, the BS 602 can perform the process 400B to determine a Rx beam format for reception of the MSG 1. Based on historical operations, the BS 602 can determine that the best Rx beam is unknown yet, and the best UE Tx beam is unknown to the UE 602. Subsequently, the BS 602 can determine the Rx beam format for reception of the MSG 1.

At S612, the MSG 1 is transmitted from the UE 601 to the BS 602 based on the Tx beam format 431 and the Rx beam format 464. The MSG 1 can implicitly carry information of the best BS Tx beam. In addition, an uplink beam measurement process can be performed to determine the best UE Tx beam and the best BS Rx beam. For example, preamble sequences can be UE Tx beam specific. By measurements of receiving power of detected preamble sequences, the best UE Tx beam can be determined. Accordingly, the associated best BS Rx beam can be determined.

At S631, the UE 601 performs the process 400B to determine a Rx beam format. Based on historical operations that the Rx beam measurement has been performed at S611, the UE 601 can determine the best UE Rx beam is known. Based on historical operation that the best BS Tx beam has been conveyed to the BS 602 at S612, the UE 601 can determine that the BS 602 has knowledge of the best BS Tx beam. Accordingly, the Rx beam format 461 can be determined for reception of the MSG 2 at the UE 601.

At S632, the BS 602 performs the process 400A to determine a Tx beam format for transmission of the MSG 2. Based on historical operation that the best BS Tx beam has been received at S612, the BS 602 can determine that the best BS Tx beam is known. Based on historical information that the beam measurement process has been performed at S611, the BS 602 can determine that the UE 601 has knowledge of the best UE Rx beam. Accordingly, the beam Tx format 431 can be determined for transmission of the MSG 2. In addition, the BS 602 can determine to convey the best UE Tx beam known at S612 to the UE 601.

At S613, the MSG 2 is transmitted to the UE 601 from the BS 602 based on the Tx beam format 431 and the Rx beam format 461. In addition, the best UE Tx beam is also conveyed to the UE 601, for example, as part of the MSG 2.

At S641, the UE 601 can perform the process 400A to determine a Tx beam format for transmission of MSG 3. At this moment, the UE 601's knowledge of historical operations has changed and is different from that known at S621. Specifically, the best UE Tx beam is received at S613, and is known to the UE 601 now. In addition, the BS 602 has knowledge of the best Rx beam due to the beam measurement process at S612. Accordingly, the Tx beam format 431 can be selected.

At S642, the BS 602 can perform the process 400B to determine a Rx beam format for reception of MSG 3. Based on historical operations that the downlink beam measurement process has been performed at S612, the BS 602 can determine the best BS Rx beam is known. Based on historical operations that the best UE Tx beam has been conveyed to the UE 601 at S613, the BS 602 can determine that the UE 601 knows the best UE Tx beam. Accordingly, the Rx beam format 461 can be determined.

At S614, the MSG 3 is transmitted based on the Tx beam format 431 and the Rx beam format 461.

At S651 and S652, the processes 400B and 400A can be performed, respectively. As no changes to the UE 601 or the BS 602's knowledge of historical operations take place compared with S631 and S632, the same Rx and Tx beam formats 461 and 431 can be obtained. Accordingly, At S615, the MSG 4 can be transmitted according to the determined Rx and Tx beam formats 461 and 431.

While random access processes as part of an initial access process are used as examples herein for explanation the Tx or Rx beam format determination techniques, the Tx or Rx beam format determination techniques described herein can be used in other random access processes used for other purposes, for example, including: reestablishing a radio link after radio-link failure, handover to a new cell, re-establishing uplink synchronization, transmitting a scheduling request, and the like.

Figure 7:
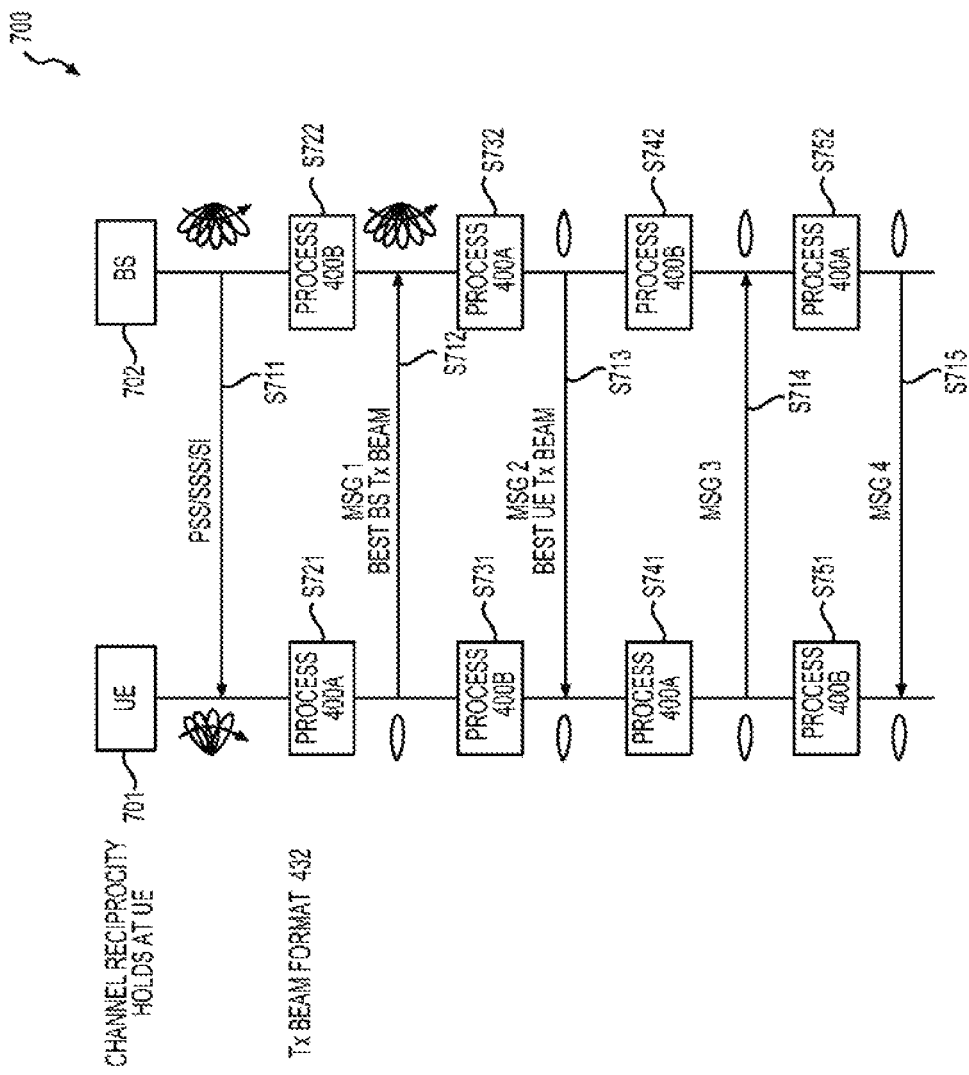
FIG. 7 shows an example random access process according to an embodiment of the disclosure.

FIG. 7 shows an example initial access process 700 according to an embodiment of the disclosure. The process 700 can include steps S711-S715 performed by a UE 701 and a BS 702. The process 700 can include a random access process that includes steps S712-S715. Particularly, the Tx or Rx beam format determination process 400A or 400B can be performed (at steps of S721-S722, S731-S732, S741-S742, and S751-S752) before each step S712-S715 at the UE 701 or the BS 702 to determine a Tx or Rx beam format for exchanging RAMs MSG 1-MSG 4.

The process 700 is similar to the process 600. However, different from the process 600, the Tx/Rx channel reciprocity is available at the UE 701. Accordingly, at S721, by performing the S512 in FIG. 5A example, the UE 701 can have knowledge of a best Tx beam. Accordingly, a Tx beam format 432 can be determined at the UE 701. As a result, at S712, the UE 701 can perform multiple transmissions of MSG 1 with the best UE transmission beam while the BS 702 can perform one or more beam sweepings to receive multiple transmissions of MSG 1. Other steps in the process 700 are similar to corresponding steps of the process 600.

Figure 8:
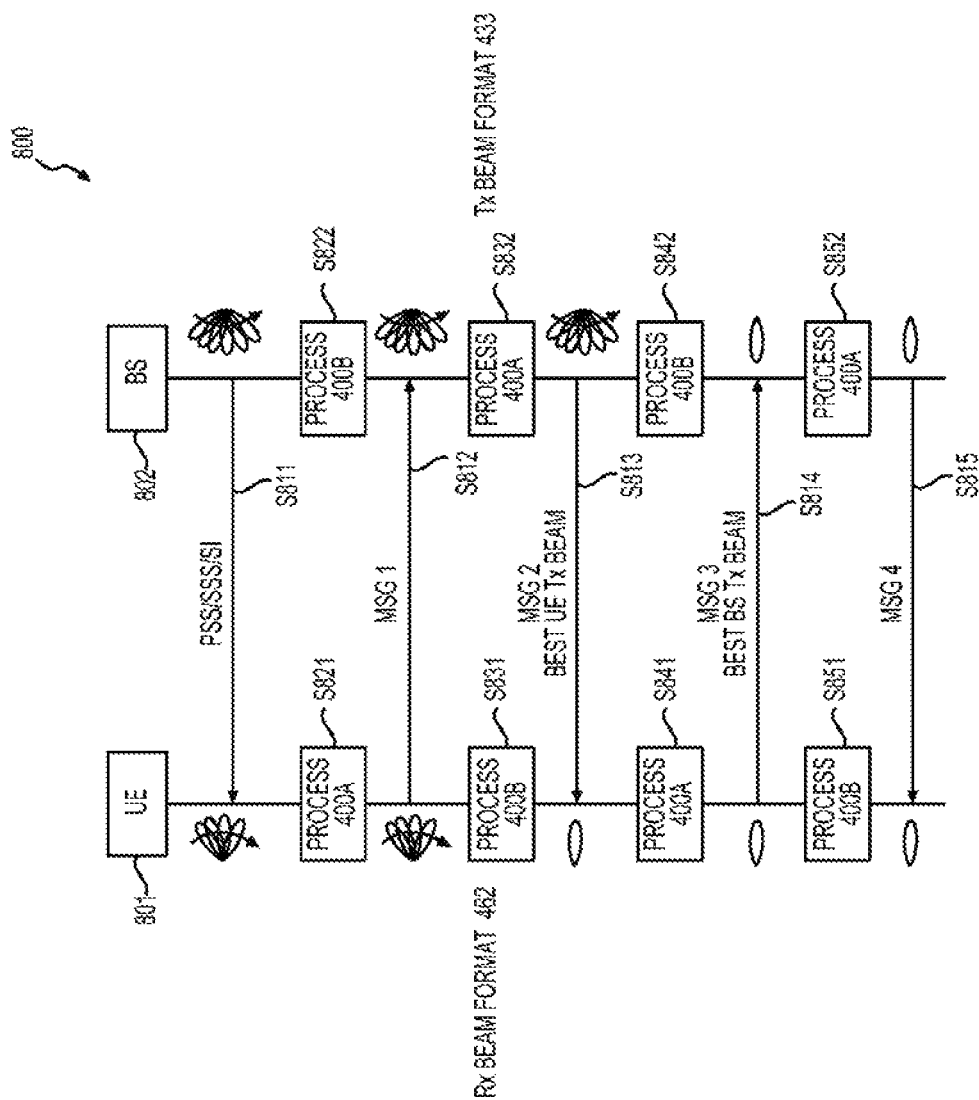
FIG. 8 shows an example random access process according to an embodiment of the disclosure.

FIG. 8 shows an example random access process 800 according to an embodiment of the disclosure. The process 800 can include steps S811-S815 performed by a UE 801 and a BS 802. The process 800 can include a random access process that includes steps S812-S815. Particularly, the Tx or Rx beam format determination process 400A or 400B can be performed (at steps of S821-S822, S831-S832, S841-S842, and S851-S852) before each step S812-S815 at the UE 801 or the BS 802 to determine a Tx or Rx beam format for exchanging RAMs MSG 1-MSG 4.

The process 800 is similar to the process 600. However, different from the process 600, the best BS Tx beam is conveyed from the UE 801 to the BS 802 at S814 instead of at S612 in FIG. 6. As a result, At S831 or S832, it can be determined that the BS 802 does not know the best BS Tx beam. Accordingly, the Rx beam format 462 and the Tx beam format 433 can be determined at the UE 801 and the BS 802, respectively. Other steps in the process 800 are similar to corresponding steps of the process 600.

Figure 9:
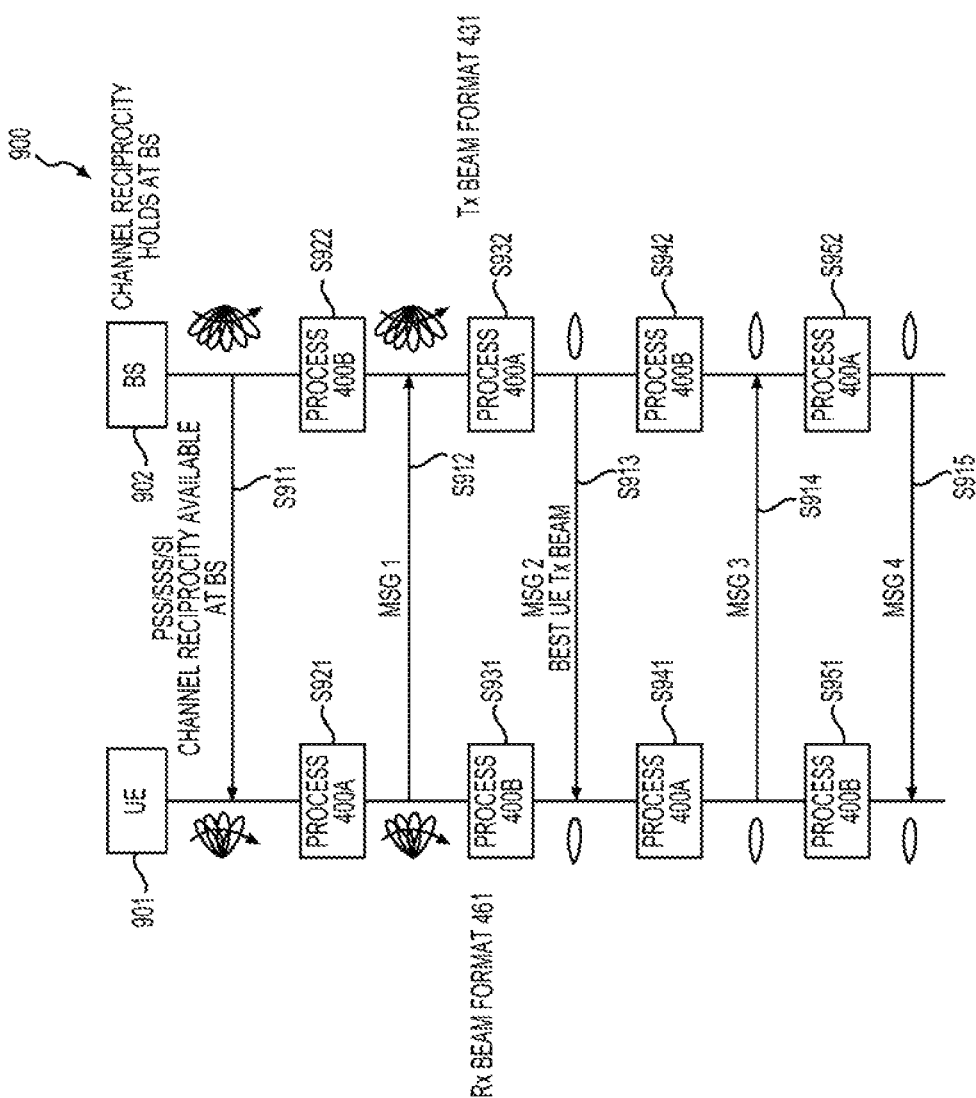
FIG. 9 shows an example random access process according to an embodiment of the disclosure.

FIG. 9 shows an example random access process 900 according to an embodiment of the disclosure. The process 900 can include steps S911-S915 performed by a UE 901 and a BS 902. The process 900 can include a random access process that includes steps S912-S915. Particularly, the Tx or Rx beam format determination process 400A or 400B can be performed (at steps of S921-S922, S931-S932, S941-S942, and S951-S952) before each step S912-S915 at the UE 901 or the BS 902 to determine a Tx or Rx beam format for exchanging RAMs MSG 1-MSG 4.

The process 900 is similar to the process 600. However, different from the process 600, the Tx/Rx channel reciprocity is available at the BS 902, which is conveyed to the UE 901 at S911, for example, by transmission of system information. In addition, the best BS Tx beam is not transmitted at S912. Under such situation, at S931 and S932, it can be determined that the BS 902 knows the best BS Tx beam because of availability of the BS Tx/Rx channel reciprocity. Accordingly, the Tx and Rx beam format 431 and 461 can be determined at the BS 902 and the UE 901, respectively. Other steps in the process 900 are similar to corresponding steps of the process 600.

Figure 10:
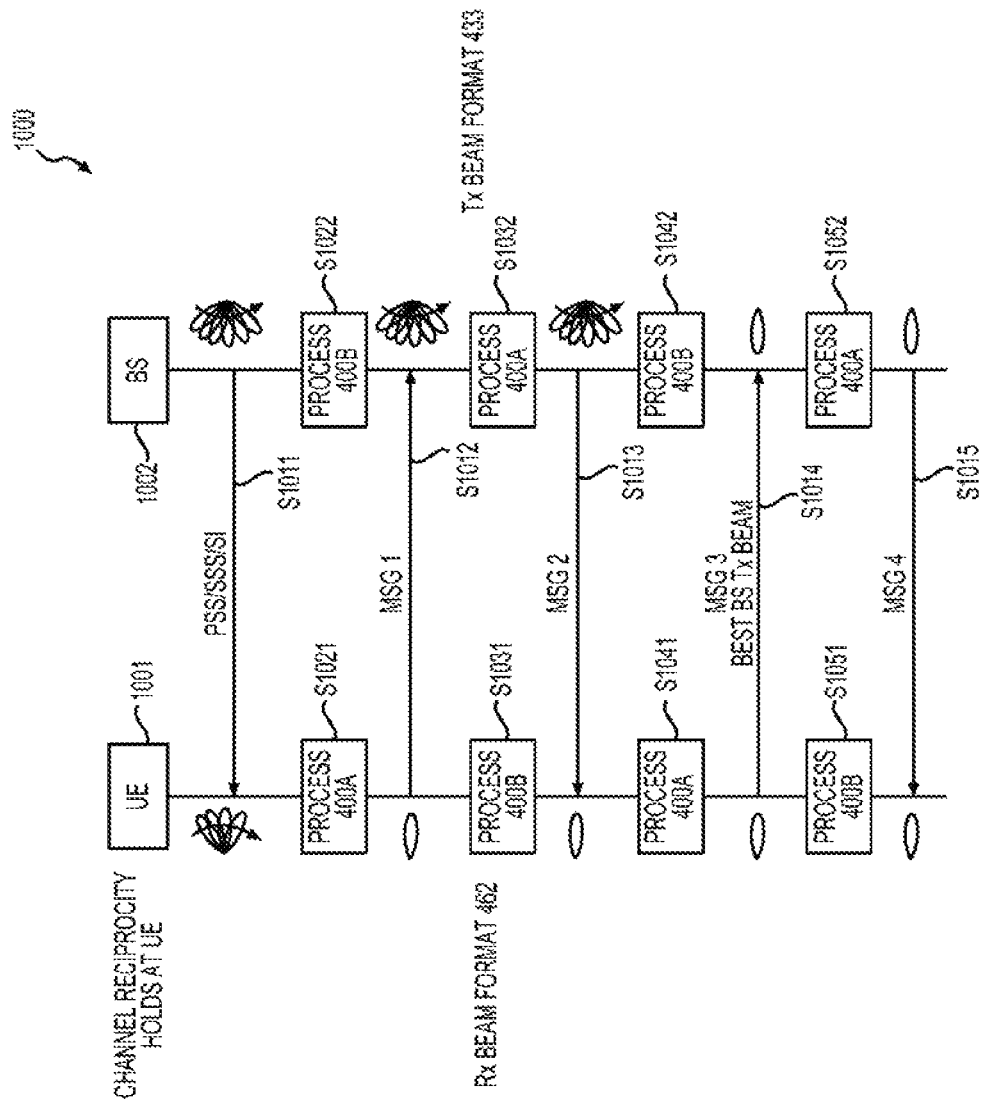
FIG. 10 shows an example random access process according to an embodiment of the disclosure.

FIG. 10 shows an example random access process 1000 according to an embodiment of the disclosure. The process 1000 can include steps S1011-S1015 performed by a UE 1001 and a BS 1002. The process 1000 can include a random access process that includes steps S1012-S1015. Particularly, the Tx or Rx beam format determination process 400A or 400B can be performed (at steps of S1021-S1022, S1031-S1032, S1041-S1042, and S1051-S1052) before each step S1012-S1015 at the UE 1001 or the BS 1002 to determine a Tx or Rx beam format for exchanging RAMs MSG 1-MSG 4.

The process 1000 is similar to the process 700. Particularly, the Tx/Rx channel reciprocity is available at UE 1001. However, different from the process 700, the best BS Tx beam is conveyed to the UE 1001 at 51014 instead of at S712 in FIG. 7. Accordingly, at S1031 and S1032, it can be determined that the BS 1002 is not aware the best BS Tx beam. Accordingly, the Tx and Rx beam format 433 and 462 can be determined at the BS 1002 and the UE 1001, respectively. Other steps in the process 1000 are similar to corresponding steps of the process 700.

Figure 11:
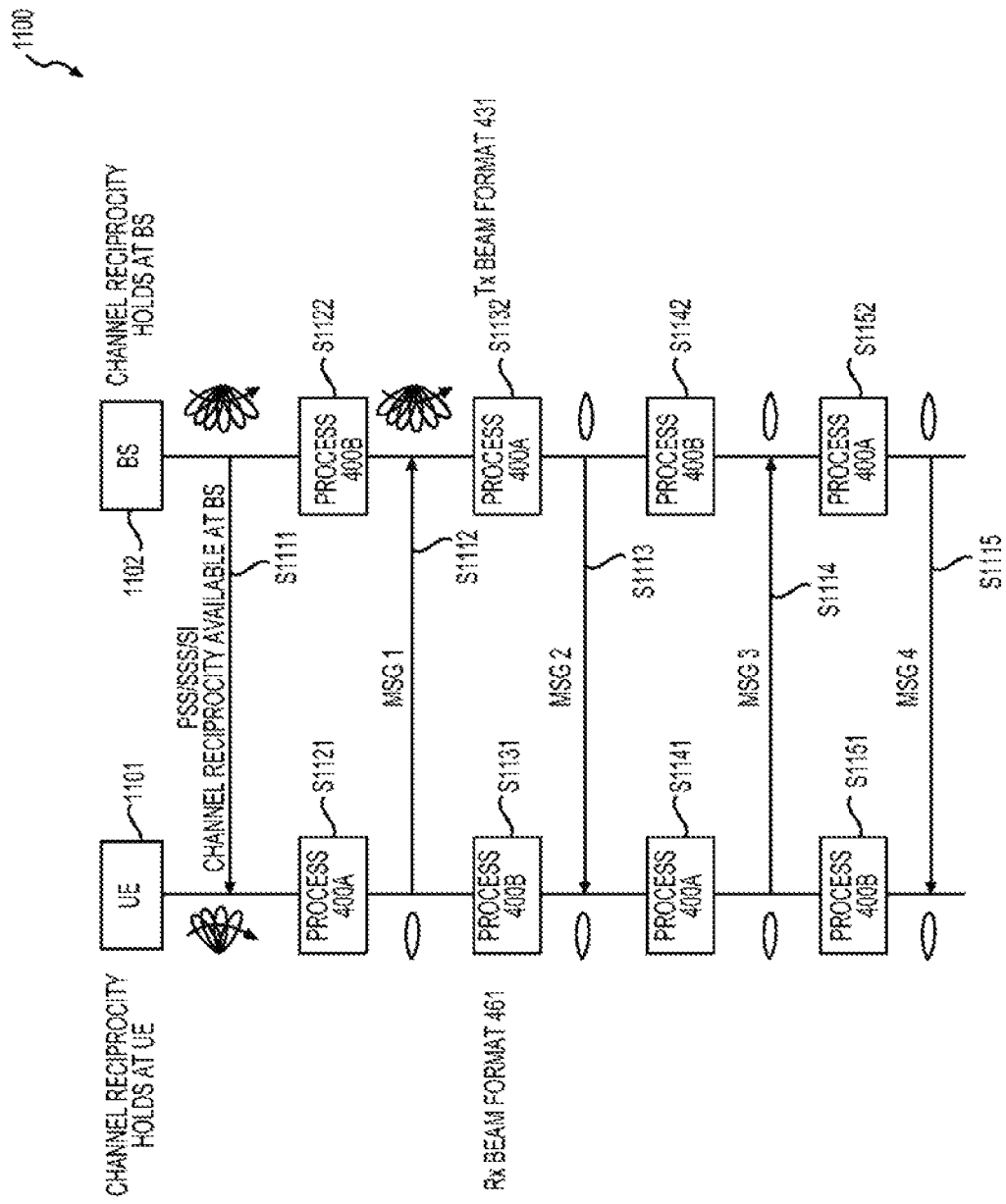
FIG. 11 shows an example random access process according to an embodiment of the disclosure.

FIG. 11 shows an example initial access process 1100 according to an embodiment of the disclosure. The process 1100 can include steps S1111-S1115 performed by a UE 1101 and a BS 1102. The process 1100 can include a random access process that includes steps S1112-S1115. Particularly, the Tx or Rx beam format determination process 400A or 400B can be performed (at steps of S1121-S1122, S1131-S1132, S1141-S1142, and S1151-S1152) before each step S1112-S1115 at the UE 1101 or the BS 1102 to determine a Tx or Rx beam format for exchanging RAMs MSG 1-MSG 4.

The process 1100 is similar to the process 1000. However, different from FIG. 10 example, Tx/Rx channel reciprocity is also available at the BS 1102, which can be conveyed at S1111. Accordingly, at S1131 and S1132, it can be determined that the BS 1102 is aware of the best BS Tx beam based on the Tx/Rx channel reciprocity and the beam measurement process at S1112. Accordingly, the Tx and Rx beam format 431 and 461 can be determined at the BS 1102 and the UE 1101, respectively. Other steps in the process 1100 are similar to corresponding steps of the process 1000.

Figure 12:
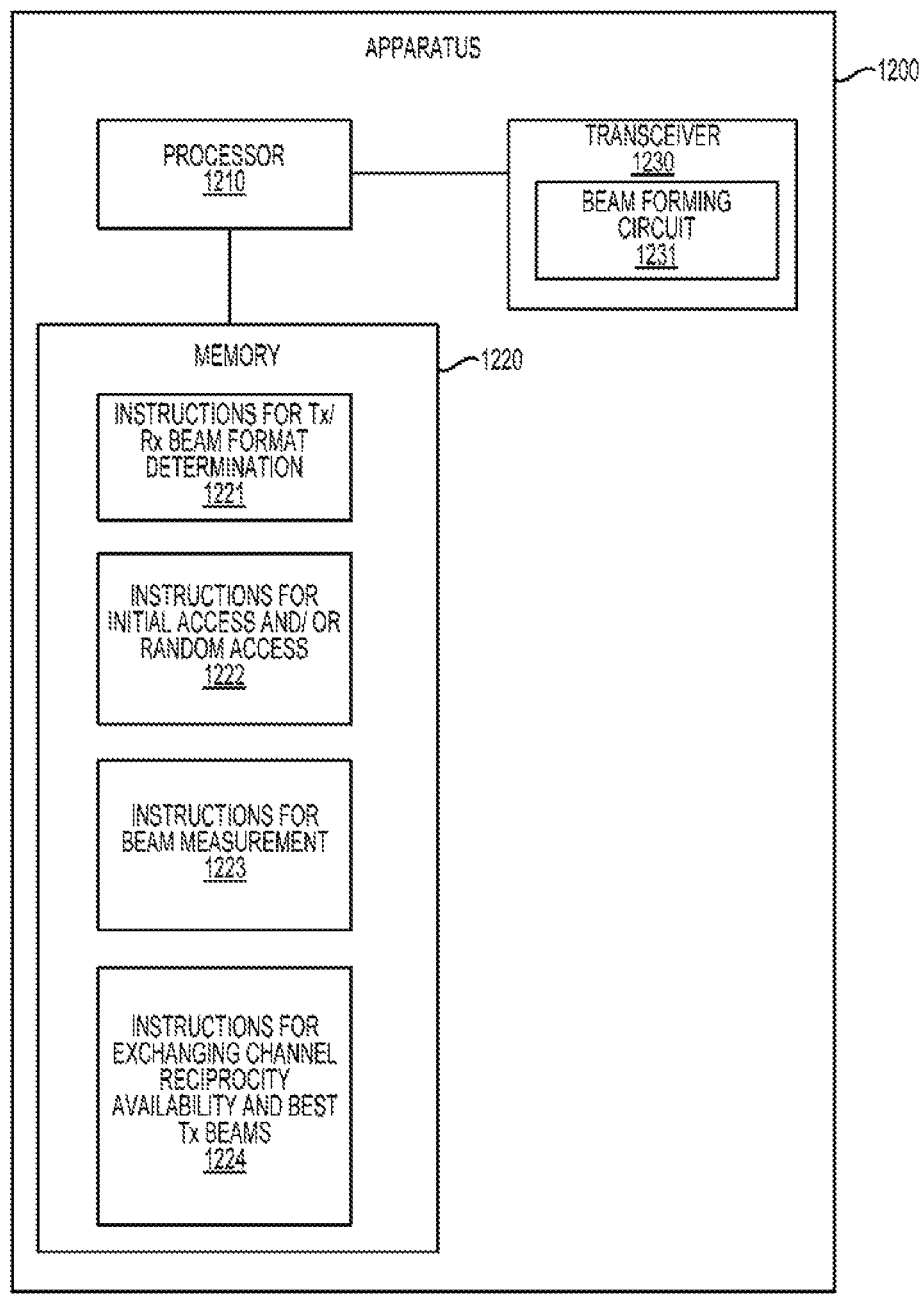
FIG. 12 shows an exemplary apparatus according to embodiments of the disclosure.

FIG. 12 shows an exemplary apparatus 1200 according to embodiments of the disclosure. The apparatus 1200 can be configured to perform various functions in accordance with one or more embodiments or examples described herein. Thus, the apparatus 1200 can provide means for implementation of techniques, processes, functions, components, systems described herein. For example, the apparatus 1200 can be used to implement the functions of a UE or BS in various examples or embodiments described herein. Accordingly, the apparatus 1200 can be used to implement various processes described herein.

The apparatus 1200 can include a processor 1210, a memory 1220, and a transceiver 1230. In a first example, the processor 1210 can include circuitry configured to perform the functions of a UE or BS described herein in combination with software or without software. In various examples, the processor 1210 can be a digital signal processor (DSP), an application specific integrated circuit (ASIC), programmable logic devices (PLDs), field programmable gate arrays (FPGAs), digitally enhanced circuits, or comparable device or a combination thereof. Although illustrated as a single processor, it will be appreciated that the processor 1210 can compromise a plurality of processors.

In a second example, the processor 1210 can be a central processing unit (CPU) configured to execute instructions to perform various functions and processes described herein. Accordingly, the memory 1220 can be configured to store program instructions for Tx or Rx beam format determination 1221, instructions for initial access and/or random access 1222, instructions for beam measurement 1223, and instructions for exchanging channel reciprocity availability and UE or BS best Tx beams 1224. The memory 1220 can further store other programs or data, such as operating systems, application programs, and the like. The memory 1220 can include a read only memory (ROM), a random access memory (RAM), a flash memory, a solid state memory, a hard disk drive, an optical disk drive, and the like.

The transceiver 1230 can enable the apparatus 1200 to transmit or receive wireless signals between a UE and a BS in a wireless network. The transceiver 1230 can be configured to support any types of radio access technologies that may be implemented by a UE or a BS described herein. Particularly, the transceiver 1230 can be configured to perform beamformed transmission or reception according to one of the Tx beam formats 431-432 or Rx beam formats 461-462 shown in FIGS. 4A-4B. The transceiver 1230 can include a beamforming circuit 1231 capable for generations of Tx or Rx beams in preconfigured directions. The beamforming circuit can employ a digital or analog beamforming architecture in various embodiments.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, such as the apparatus 1200, including obtaining the computer program through physical medium or distributed system, including, for example, from a server connected to the Internet.

The computer program may be accessible from a computer-readable medium providing program instructions for use by or in connection with a computer or any instruction execution system. A computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
   determining, at a local entity, a transmission (Tx) beam format or a reception (Rx) beam format for communication between the local entity and a remote entity during communications between the local entity and the remote entity in a wireless communication system employing beamforming techniques according to one or more of,
   Tx/Rx channel reciprocity availability of the local entity,
   Tx/Rx channel reciprocity availability of the remote entity,
   whether a Rx beam measurement process is performed at the local entity,
   whether a remote best Tx beam known from the Rx beam measurement process is reported to the remote entity,
   whether a Tx beam measurement process is performed at the local entity, and
   whether a local best Tx beam known from the Tx beam measurement process is received from the remote entity,
   wherein
   the determining the Tx beam format includes:
      determining the local entity's knowledge of the local best Tx beam,
      determining the remote entity's knowledge of a remote best Rx beam, and
      determining the Tx beam format based on the local entity's knowledge of the local best Tx beam, and the remote entity's knowledge of the remote best Rx beam, and
   the determining the Rx beam format includes:
      determining the local entity's knowledge of a local best Rx beam;
      determining the remote entity's knowledge of the remote best Tx beam; and determining the Rx beam format based on the local entity's knowledge of the local best Rx beam, and the remote entity's knowledge of the remote best Tx beam; and transmitting or receiving, at the local entity, a message exchanged between the local entity and the remote entity according to the determined Tx beam format or Rx beam format, respectively.

2. The method of claim 1, wherein the Tx beam format is one of following Tx beam formats:
one transmission of the message using the local best Tx beam,
multiple transmissions of the message using the local best Tx beam,
one round of Tx beam sweeping, and
a full Tx/Rx beam weeping for transmission of the message.

3. The method of claim 1, wherein the Rx beam format is one of following Rx beam formats:
one reception of the message using the local best Rx beam,
multiple receptions of the message using the local best Rx beam,
one round of Rx beam sweeping, and
a full Tx/Rx beam weeping for reception of the message.

4. The method of claim 1, wherein determining the local entity's knowledge of the local best Tx beam includes:
when the local best Tx beam is received from the remote entity, or when local Tx/Rx channel reciprocity is available and the Rx beam measurement process is performed, determining the local entity knows the local best Tx beam; and
when the local best Tx beam is not received from the remote entity, and when local Tx/Rx channel reciprocity is unavailable or the Rx beam measurement process is not performed, determining the local best Tx beam is unknown to the local entity.

5. The method of claim 1, wherein determining the remote entity's knowledge of the remote best Rx beam includes:
when the local Tx beam measurement process is performed, or when remote Tx/Rx channel reciprocity is available and the remote best Tx beam is reported to the remote entity, determining the remote entity knows the remote best Rx beam; and
when the local Tx beam measurement process is not performed, and when remote Tx/Rx channel reciprocity is unavailable or the remote best Tx beam is not reported to the remote entity, determining the remote best Rx beam is unknown to the remote entity.

6. The method of claim 1, wherein determining the local entity's knowledge of the local best Rx beam includes:
when the local Rx beam measurement process is performed, or when local Tx/Rx channel reciprocity is available and the local best Tx beam is received from the remote entity, determining that the local entity knows the local best Rx beam; and
when the local Rx beam measurement process is not performed, and when local Tx/Rx channel reciprocity is unavailable or the local best Tx beam is not received from the remote entity, determining that the local best Rx beam is unknown to the local entity.

7. The method of claim 1, wherein determining the remote entity's knowledge of the remote best Tx beam includes:
when the remote best Tx beam is reported to the remote entity, or remote Tx/Rx channel reciprocity is available and the local Tx beam measurement process is performed, determining the remote entity knows the remote best Tx beam; and
when the remote best Tx beam is not reported to the remote entity, and remote Tx/Rx channel reciprocity is unavailable or the local Tx beam measurement process is not performed, determining the remote best Tx beam is unknown to the remote entity.

8. An apparatus, comprising circuitry configured to:
determine a transmission (Tx) beam format or a reception (Rx) beam format for communication between the apparatus and a remote entity during communications between the apparatus and the remote entity in a wireless communication system employing beamforming techniques according to one or more of,
Tx/Rx channel reciprocity availability of the apparatus,
Tx/Rx channel reciprocity availability of the remote entity,
whether a Rx beam measurement process is performed at the apparatus,
whether a remote best Tx beam known from the Rx beam measurement process is reported to the remote entity,
whether a Tx beam measurement process is performed at the apparatus, and
whether a local best Tx beam known from the Tx beam measurement process is received from the remote entity,
wherein
the circuitry is configured to:
determine the apparatus's knowledge of the local best Tx beam,
determine the remote entity's knowledge of a remote best Rx beam, and
determine the Tx beam format based on the apparatus's knowledge of the local best Tx beam, and the remote entity's knowledge of the remote best Rx beam, and
the circuitry is further configured to:
determine the apparatus's knowledge of a local best Rx beam;
determine the remote entity's knowledge of the remote best Tx beam; and
determine the Rx beam format based on the apparatus's knowledge of the local best Rx beam, and the remote entity's knowledge of the remote best Tx beam; and
transmit or receive a random access message (RAM) message exchanged between the apparatus and the remote entity according to the determined Tx beam format or Rx beam format, respectively.

9. The apparatus of claim 8, wherein the Tx beam format is one of following Tx beam formats:
one transmission of the message using the local best Tx beam,
multiple transmissions of the message using the local best Tx beam,
one round of Tx beam sweeping, and
a full Tx/Rx beam weeping for transmission of the message.

10. The apparatus of claim 8, wherein the Rx beam format is one of following Rx beam formats:
one reception of the message using the local best Rx beam,
multiple receptions of the message using the local best Rx beam, one round of Rx beam sweeping, and
a full Tx/Rx beam weeping for reception of the message.

11. The apparatus of claim 8, wherein the circuitry is further configured to:
   when the local best Tx beam is received from the remote entity, or when local Tx/Rx channel reciprocity is available and the Rx beam measurement process is performed, determine the apparatus knows the local best Tx beam; and
   when the local best Tx beam is not received from the remote entity, and when local Tx/Rx channel reciprocity is unavailable or the Rx beam measurement process is not performed, determine the local best Tx beam is unknown to the apparatus.

12. The apparatus of claim 8, wherein the circuitry is further configured to:
   when the local Tx beam measurement process is performed, or when remote Tx/Rx channel reciprocity is available and the remote best Tx beam is reported to the remote entity, determine the remote entity knows the remote best Rx beam; and
   when the local Tx beam measurement process is not performed, and when remote Tx/Rx channel reciprocity is unavailable or the remote best Tx beam is not reported to the remote entity, determine the remote best Rx beam is unknown to the remote entity.

13. The apparatus of claim 8, wherein the circuitry is further configured to:
   when the local Rx beam measurement process is performed, or when local Tx/Rx channel reciprocity is available and the local best Tx beam is received from the remote entity, determine that the apparatus knows the local best Rx beam; and
   when the local Rx beam measurement process is not performed, and when local Tx/Rx channel reciprocity is unavailable or the local best Tx beam is not received from the remote entity, determine that the local best Rx beam is unknown to the apparatus.

14. The apparatus of claim 8, wherein the circuitry is further configured to:
   when the remote best Tx beam is reported to the remote entity, or remote Tx/Rx channel reciprocity is available and the local Tx beam measurement process is performed, determine the remote entity knows the remote best Tx beam; and
   when the remote best Tx beam is not reported to the remote entity, and remote Tx/Rx channel reciprocity is unavailable or the local Tx beam measurement process is not performed, determine the remote best Tx beam is unknown to the remote entity.

15. A non-transitory computer-readable medium storing computer instructions that, when executed by a processor, cause the processor to perform a method, the method comprising:
   determining a transmission (Tx) beam format or a reception (Rx) beam format for communication between a local entity and a remote entity during communications between the local entity and the remote entity in a wireless communication system employing beamforming techniques according to one or more of,
      Tx/Rx channel reciprocity availability of the local entity,
      Tx/Rx channel reciprocity availability of the remote entity,
      whether a Rx beam measurement process is performed at the local entity,
      whether a remote best Tx beam known from the Rx beam measurement process is reported to the remote entity,
      whether a Tx beam measurement process is performed at the local entity, and
      whether a local best Tx beam known from the Tx beam measurement process is received from the remote entity,
   wherein
      the determining the Tx beam format includes:
         determining the local entity's knowledge of the local best Tx beam,
         determining the remote entity's knowledge of a remote best Rx beam, and
         determining the Tx beam format based on the local entity's knowledge of the local best Tx beam, and the remote entity's knowledge of the remote best Rx beam, and
      the determining the Rx beam format includes:
         determining the local entity's knowledge of a local best Rx beam;
         determining the remote entity's knowledge of the remote best Tx beam; and
         determining the Rx beam format based on the local entity's knowledge of the local best Rx beam, and the remote entity's knowledge of the remote best Tx beam; and
   transmitting or receiving a message exchanged between the local entity and the remote entity according to the determined Tx beam format or Rx beam format, respectively.

16. The non-transitory computer-readable medium of claim 15, wherein the Tx beam format is one of following Tx beam formats:
   one transmission of the message using the local best Tx beam,
   multiple transmissions of the message using the local best Tx beam,
   one round of Tx beam sweeping, and
   a full Tx/Rx beam weeping for transmission of the message.

* * * * *

UNITED STATES PATENT AND TRADEMARK OFFICE
CERTIFICATE OF CORRECTION

| | |
|---|---|
| PATENT NO. | : 10,805,961 B2 |
| APPLICATION NO. | : 16/310217 |
| DATED | : October 13, 2020 |
| INVENTOR(S) | : Yuanyuan Zhang et al. |

It is certified that error appears in the above-identified patent and that said Letters Patent is hereby corrected as shown below:

On the Title Page

Item (30), the Foreign Application Priority Data has been omitted. Item (30) should read:
--(30) Foreign Application Priority Data
Nov. 4, 2016 (CN).................... PCT/CN2016/104621--

Signed and Sealed this
Fifteenth Day of December, 2020

Andrei Iancu
*Director of the United States Patent and Trademark Office*